United States Patent
Asano

(10) Patent No.: US 12,267,019 B2
(45) Date of Patent: Apr. 1, 2025

(54) POWER SUPPLY APPARATUS CAPABLE OF SWITCHING OUTPUT RESISTANCE

(71) Applicant: CANON KABUSHIKI KAISHA, Tokyo (JP)

(72) Inventor: Hiroki Asano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/505,346

(22) Filed: Nov. 9, 2023

(65) Prior Publication Data

US 2024/0195308 A1   Jun. 13, 2024

(30) Foreign Application Priority Data

Dec. 9, 2022 (JP) .................................. 2022-197364

(51) Int. Cl.
*G03G 15/00* (2006.01)
*H02M 3/335* (2006.01)

(52) U.S. Cl.
CPC .... *H02M 3/33523* (2013.01); *G03G 15/5004* (2013.01); *H02M 3/33569* (2013.01)

(58) Field of Classification Search
CPC .............. G03G 15/5004; G03G 15/80; H02M 3/33523; H02M 3/33569
See application file for complete search history.

(56) References Cited

U.S. PATENT DOCUMENTS

| | | |
|---|---|---|
| 8,280,272 B2 | 10/2012 | Kim |
| 9,966,865 B2 | 5/2018 | Shimura et al. |
| 10,139,770 B2 | 11/2018 | Shimura et al. |
| 10,320,299 B2 | 6/2019 | Shimura et al. |
| 10,389,259 B2 | 8/2019 | Asano et al. |
| 10,432,084 B2 | 10/2019 | Saito et al. |
| 10,498,246 B2 | 12/2019 | Shimura et al. |
| 10,547,242 B2 | 1/2020 | Asano et al. |
| 10,630,161 B2 | 4/2020 | Shimura et al. |
| 10,715,049 B2 | 7/2020 | Asano |
| 10,720,845 B2 | 7/2020 | Shimura |
| 2017/0005585 A1* | 1/2017 | Shimura ................. G03G 15/80 |
| 2019/0098159 A1* | 3/2019 | Asano ...................... H02M 7/00 |
| 2019/0131879 A1* | 5/2019 | Oshima ............ G01R 19/16547 |
| 2023/0408949 A1 | 12/2023 | Asano |

FOREIGN PATENT DOCUMENTS

| | | |
|---|---|---|
| JP | 2001-350352 A | 12/2001 |
| JP | 2006-235218 A | 9/2006 |
| JP | 2009-163221 A | 7/2009 |

* cited by examiner

*Primary Examiner* — Hoang X Ngo
(74) *Attorney, Agent, or Firm* — Venable LLP

(57) ABSTRACT

A resistance switching circuit includes a resistor forming an output resistance of a first power supply. The resistance switching circuit switches between a state in which the resistor forms part of an output resistance and a state in which the resistor does not form part of the output resistance. A control circuit is configured to in a case where a DC voltage with a first polarity is applied to a load from a first power supply, control the resistance switching circuit such that the resistor does not form part of the output resistance, and in a case where a DC voltage with a second polarity is applied to the load from a second power supply, control the resistance switching circuit such that the resistor forms part of the output resistance.

19 Claims, 15 Drawing Sheets

F I G. 4
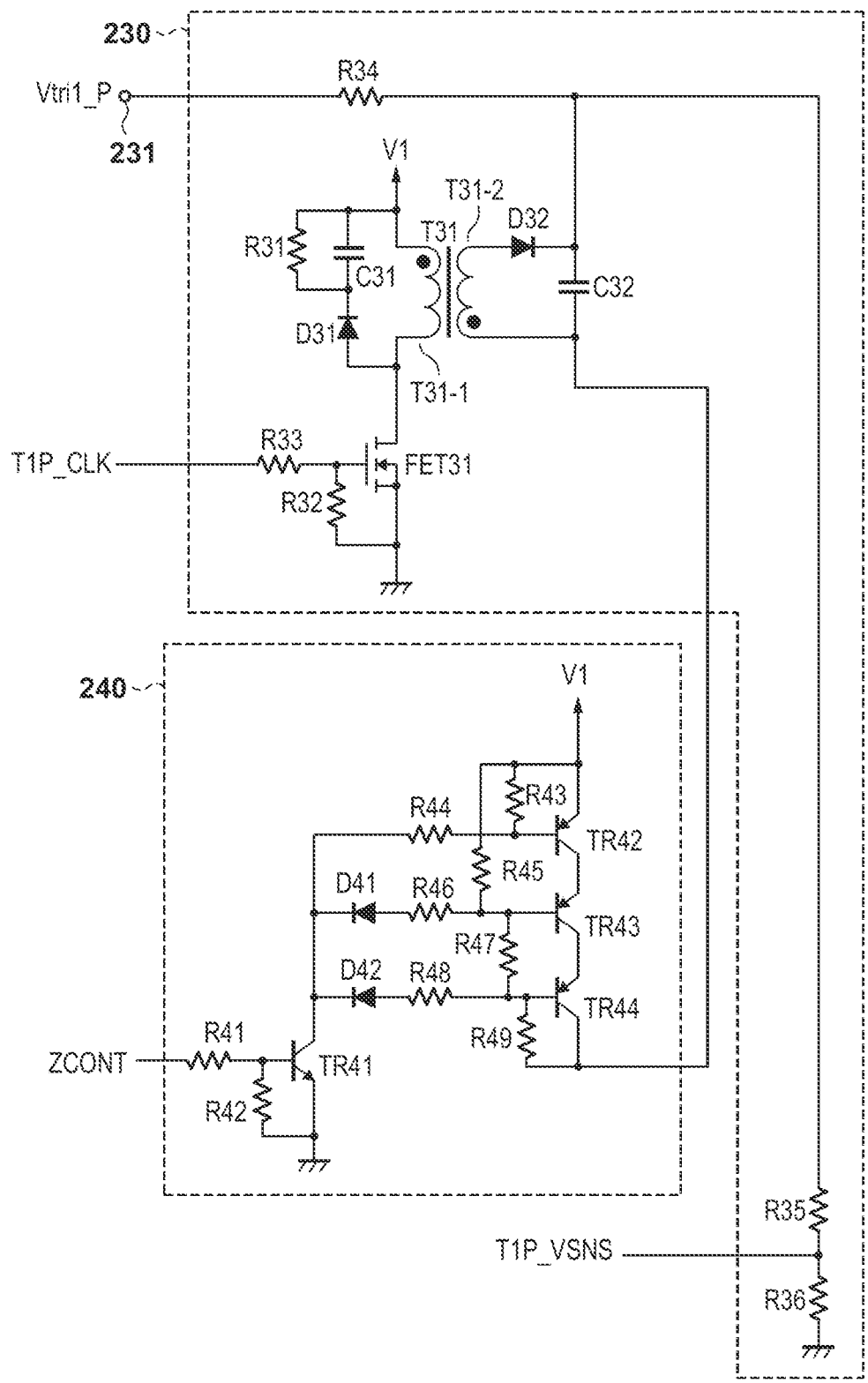

FIG. 5

| | | IN CASE WHERE POSITIVE VOLTAGE IS APPLIED | IN CASE WHERE NEGATIVE VOLTAGE IS APPLIED |
|---|---|---|---|
| CONTROL SIGNAL | ZCONT | Hi | Lo |
| | T1P_CLK | ON | OFF |
| | T2N_CLK | OFF OR ON | ON |
| OUTPUT RESISTANCE | POSITIVE POWER SUPPLY 230 | R34 | Rx=R34+R45+R47+R49 |
| | NEGATIVE POWER SUPPLY 220 | R29 | R29 |
| VOLTAGE APPLIED TO PRIMARY TRANSFER ROLLER | | $\mathrm{Vtr1\_P} - \dfrac{\dfrac{R34}{R29} \times \mathrm{Vtri2\_N}}{\dfrac{R34}{R29}+1}$ ※ WHEN R34<<R29, Vtr1_P | $\dfrac{1}{\dfrac{R29}{Rx}+1} \times \mathrm{Vtri2\_N}$ ※ WHEN R29<<Rx, Vtr1_N (=Vtri2_N) |

FIG. 12

| | | IN CASE WHERE POSITIVE VOLTAGE IS APPLIED | IN CASE WHERE NEGATIVE VOLTAGE IS APPLIED |
|---|---|---|---|
| CONTROL SIGNAL | ZCONT | PULSE OF PREDETERMINED FREQUENCY OR GREATER | Lo OR Hi |
| | T1P_CLK | ON | OFF |
| | T2N_CLK | OFF OR ON | ON |
| OUTPUT RESISTANCE | POSITIVE POWER SUPPLY 230 | R34 | Ry=R34+R55+R57+R59 |
| | NEGATIVE POWER SUPPLY 220 | R29 | R29 |
| VOLTAGE APPLIED TO PRIMARY TRANSFER ROLLER | | $\dfrac{Vtri1\_P - \dfrac{R34}{R29} \times Vtri2\_N}{\dfrac{R34}{R29} + 1}$ ※ WHEN R34<<R29, Vtri1_P | $\dfrac{1}{\dfrac{R29}{Ry} + 1} \times Vtri2\_N$ ※ WHEN R29<<Ry, Vtri1_N (=Vtri1_N) |

F I G. 13A
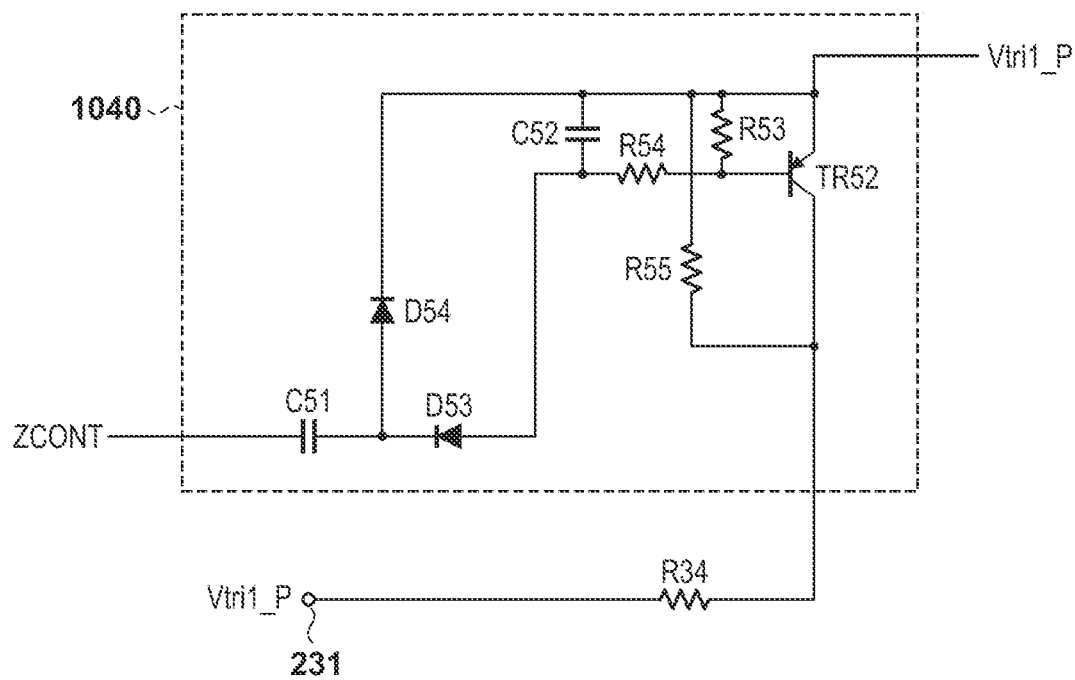
F I G. 13B
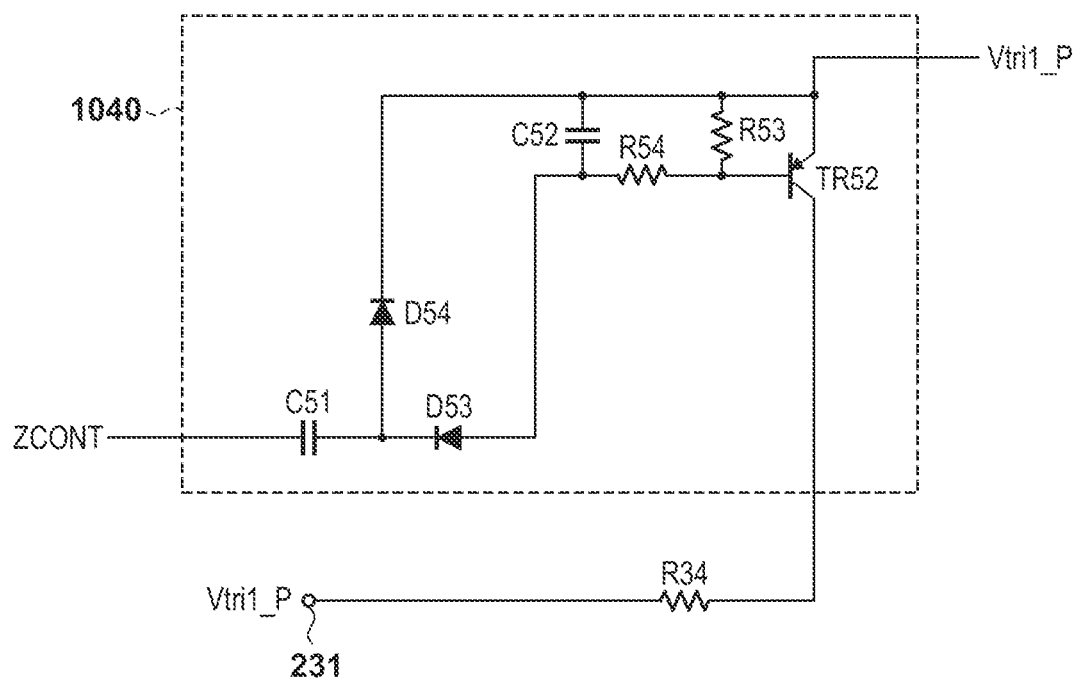

POWER SUPPLY APPARATUS CAPABLE OF SWITCHING OUTPUT RESISTANCE

BACKGROUND OF THE INVENTION

Field of the Invention

The present invention relates to a power supply apparatus capable of switching output resistance.

Description of the Related Art

Electro-photographic image forming apparatuses are electronic devices that require a positive polarity voltage and a negative polarity voltage. Thus, a power supply apparatus with a positive power supply and a negative power supply connected in parallel is required. However, with such a power supply apparatus, when one power supply circuit is operated, the other power supply circuit affects the output voltage and reduces it. Thus, an excessive voltage must be generated, taking into account the reduction in the output voltage. However, by increasing the circuit size in the power supply apparatus, the manufacturing cost is increased and space is needed for the additional circuit. U.S. Pat. No. 8,280,272 discloses a power supply apparatus provided with a rectifying and smoothing circuit that generates a positive polarity high voltage on a secondary side of a transformer, a negative polarity rectifying and smoothing circuit, and a switching circuit that alternative selects the two.

According to U.S. Pat. No. 8,280,272, the switching circuit is provided between one transformer and a plurality of rectifying and smoothing circuits, and a switching circuit is not provided between the plurality of rectifying and smoothing circuits and a load. Also, in U.S. Pat. No. 8,280,272, though the capability of the switching circuit to resist high voltage AC is required, no specific configuration of the switching circuit is given.

SUMMARY OF THE INVENTION

The present disclosure provides a power supply apparatus comprising: a first power supply configured to apply a DC voltage with a first polarity to a load; a second power supply connected in parallel with the first power supply, the second power supply being configured to apply a DC voltage with a second polarity, opposite the first polarity, to the load via a first resistor connected to the load; a resistance switching circuit including a second resistor forming an output resistance of the first power supply, the resistance switching circuit being configured to switch between a state in which the second resistor forms part of the output resistance and a state in which the second resistor does not form part of the output resistance; and a control circuit configured to control the first power supply, the second power supply, and the resistance switching circuit, wherein the control circuit is configured to in a case where a DC voltage with the first polarity is applied to the load from the first power supply, control the resistance switching circuit such that the second resistor does not form part of the output resistance, and in a case where a DC voltage with the second polarity is applied to the load from the second power supply, control the resistance switching circuit such that the second resistor forms part of the output resistance, and a resistance value of the output resistance when the second resistor is formed as part of the output resistance is greater than a resistance value of the output resistance when the second resistor is not formed as part of the output resistance.

Further features of the present invention will become apparent from the following description of exemplary embodiments (with reference to the attached drawings).

BRIEF DESCRIPTION OF THE DRAWINGS

FIG. 4 is a diagram for describing a positive power supply for primary transfer and a resistance switching circuit.
FIG. 5 is a diagram for describing the relationship between the polarity of a primary transfer voltage and a control signal.
FIG. 12 is a diagram for describing the relationship between the polarity of the primary transfer voltage and the control signal.
FIG. 13A is a diagram for describing a modified example of the resistance switching circuit.
FIG. 13B is a diagram for describing a modified example of the resistance switching circuit.

DESCRIPTION OF THE EMBODIMENTS

Figure 1:
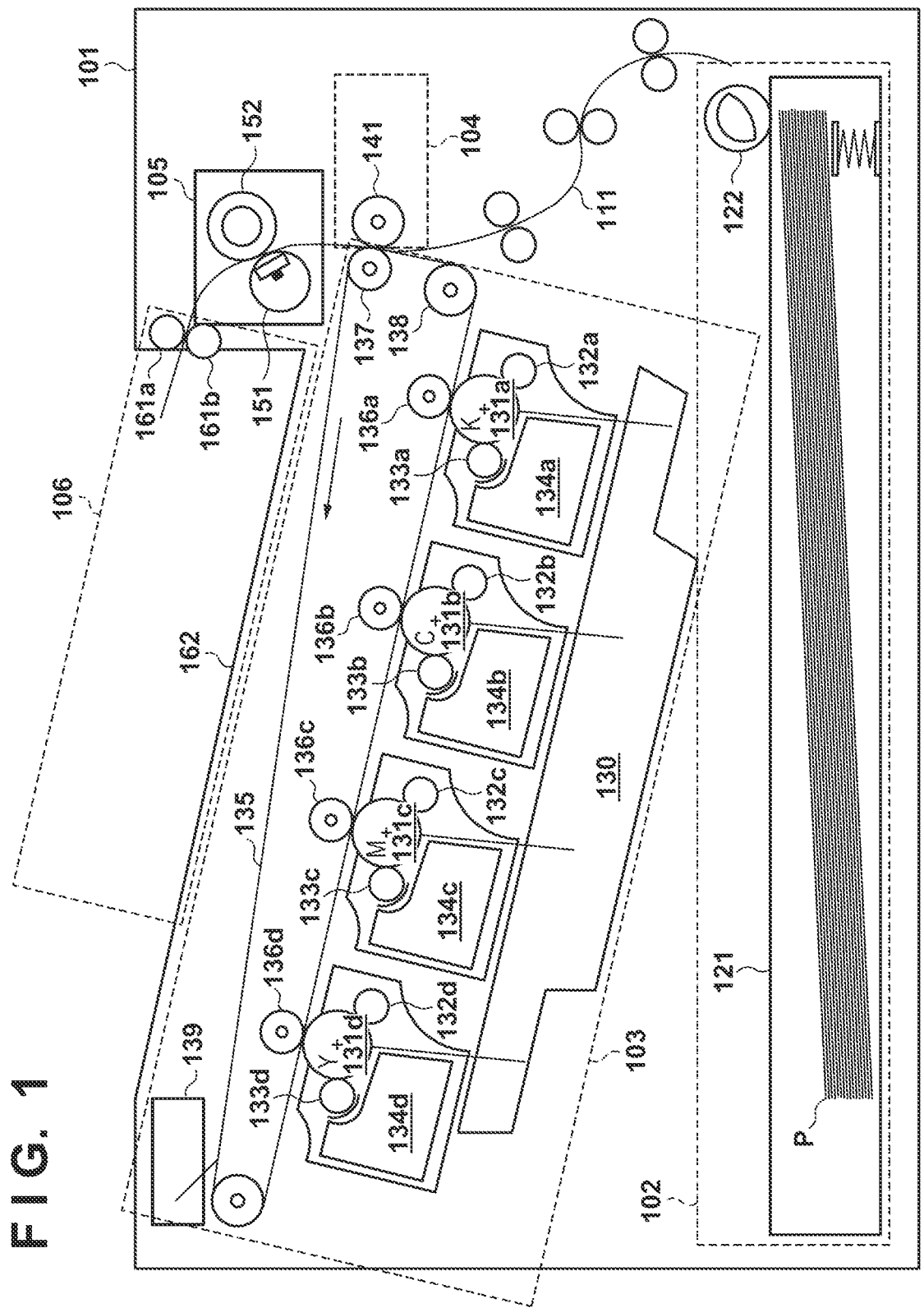
FIG. 1 is a diagram for describing an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Image Forming Apparatus Configuration

FIG. 1 is a cross-sectional view of an image forming apparatus 101. A feeding unit 102 feeds a sheet P to a conveyance path 111. An image forming unit 103 uses black (K), cyan (C), magenta (M), and yellow (Y) toner to form an image on an intermediate conveyor belt 135. The intermediate conveyor belt 135 moves in the direction of the arrow in FIG. 1. A transfer unit 104 transfers a toner image from the intermediate conveyor belt 135 to the sheet P. A fixing unit 105 fixes the toner image on the sheet P. A discharge unit 106 discharges the sheet P to the outside of the image forming apparatus 101.

The feeding unit 102 includes a feed tray 121 and a feeding roller 122. The feed tray 121 is a feed chamber for storing sheets (printing media) to be printed on. The feeding roller 122 feeds the sheets one at a time from the feed tray 121 to the conveyance path 111.

The image forming unit 103 includes four print stations corresponding to KCMY Since the configuration of each station is the same, the characters abcd added to the end of the reference signs will be omitted.

A charging roller 132 uniformly charges the surface of a photosensitive drum 131 (charging process). An exposure apparatus 130 outputs laser beams corresponding to the image signal and exposes the surface of the photosensitive drum 131 to form an electrostatic latent image (exposure process). A developing roller 133 adheres the toner supplied from a toner container 134 to the photosensitive drum 131 to form a toner image from the electrostatic latent image (developing process).

A primary transfer roller 136 transfers the toner image from the photosensitive drum 131 to the intermediate conveyor belt 135. A primary transfer voltage to promote transfer of the toner image is applied to the primary transfer roller 136. By transferring each YMCK toner image in order to the intermediate conveyor belt 135, a full color image is formed.

The intermediate conveyor belt 135 is installed at tension around the primary transfer rollers 136a, 136b, 136c, and 136d, an opposing roller 137, and a tension roller 138. A cleaning blade 139 cleans off the toner remaining on the intermediate conveyor belt 135.

A secondary transfer roller 141 of the transfer unit 104 is applied with a secondary transfer voltage and transfer the toner image from the intermediate conveyor belt 135 to the sheet P.

A high voltage (hereinafter, also referred to as "voltage") is applied to the components of the image forming unit 103 and the transfer unit 104. Specifically, the locations where the voltage is applied include the charging rollers 132a, 132b, 132c, and 132d, the developing rollers 133a, 133b, 133c, and 133d, the primary transfer rollers 136a, 136b, 136c, and 136d, and the secondary transfer roller 141. The image forming apparatus 101 charges the toner with negative polarity. Thus, the charging rollers 132a, 132b, 132c, and 132d and the developing rollers 133a, 133b, 133c, and 133d are applied with a negative polarity voltage. The primary transfer rollers 136a, 136b, 136c, and 136d and the secondary transfer roller 141 are applied with a positive polarity voltage.

The fixing unit 105 includes a fixing roller 151 and a pressure roller 152. The fixing roller 151 and the pressure roller 152 supply heat and pressure to the sheet P to fix the toner image to the sheet P.

The discharge unit 106 includes discharge rollers 161a and 161b and a discharge tray 162. The discharge rollers 161a and 161b discharge the sheet P to the discharge tray 162.

Voltage

During image formation, the toner container 134a agitates the toner to charge the toner with negative polarity, which is normal charge polarity. Thus, the primary transfer roller 136 is applied with a positive polarity voltage, which is the opposite polarity to the normal charge polarity. In a similar manner, the secondary transfer roller 141 is also applied with a positive polarity voltage.

A portion of the toner transferred to the intermediate conveyor belt 135 may not be transferred to the sheet P and remain on the surface of the intermediate conveyor belt 135. This toner is scraped off by the cleaning blade 139. Spilt toner is attracted to the positive polarity voltage applied to the secondary transfer roller 141 and may adhere to the surface of the secondary transfer roller 141. However, when the image formation ends, a negative polarity voltage is applied to the secondary transfer roller 141. Thus, the toner adhered to the surface of the secondary transfer roller 141 returns to the surface of the intermediate conveyor belt 135.

Also, an electric discharge may occur between one of the photosensitive drums 131 and the toner carried on the surface of the intermediate conveyor belt 135, causing the toner to be positively charged. The positively charged toner is conveyed downstream from the intermediate conveyor belt 135. Then, the positively charged toner is attracted to another photosensitive drum 131 which is negatively charged. Consider an example in which an electric discharge occurs at the magenta photosensitive drum 131c. In this example, the positively charged magenta toner adheres to the negatively charged cyan photosensitive drum 131b. Then, a negative voltage is applied to the primary transfer rollers 136a, 136b, 136c, and 136d. Accordingly, the positive toner adhered to the surface of the photosensitive drums 131a, 131b, 131c, and 131d is again transferred to the surface of the intermediate conveyor belt 135.

In any case, the toner returned to the surface of the intermediate conveyor belt 135 is scraped off by the cleaning blade 139. Also, the application of a negative voltage to the primary transfer roller 136 and the secondary transfer roller 141 is performed by a special sequence (cleaning sequence) different from the print sequence.

Power Supply Apparatus

Figure 2:
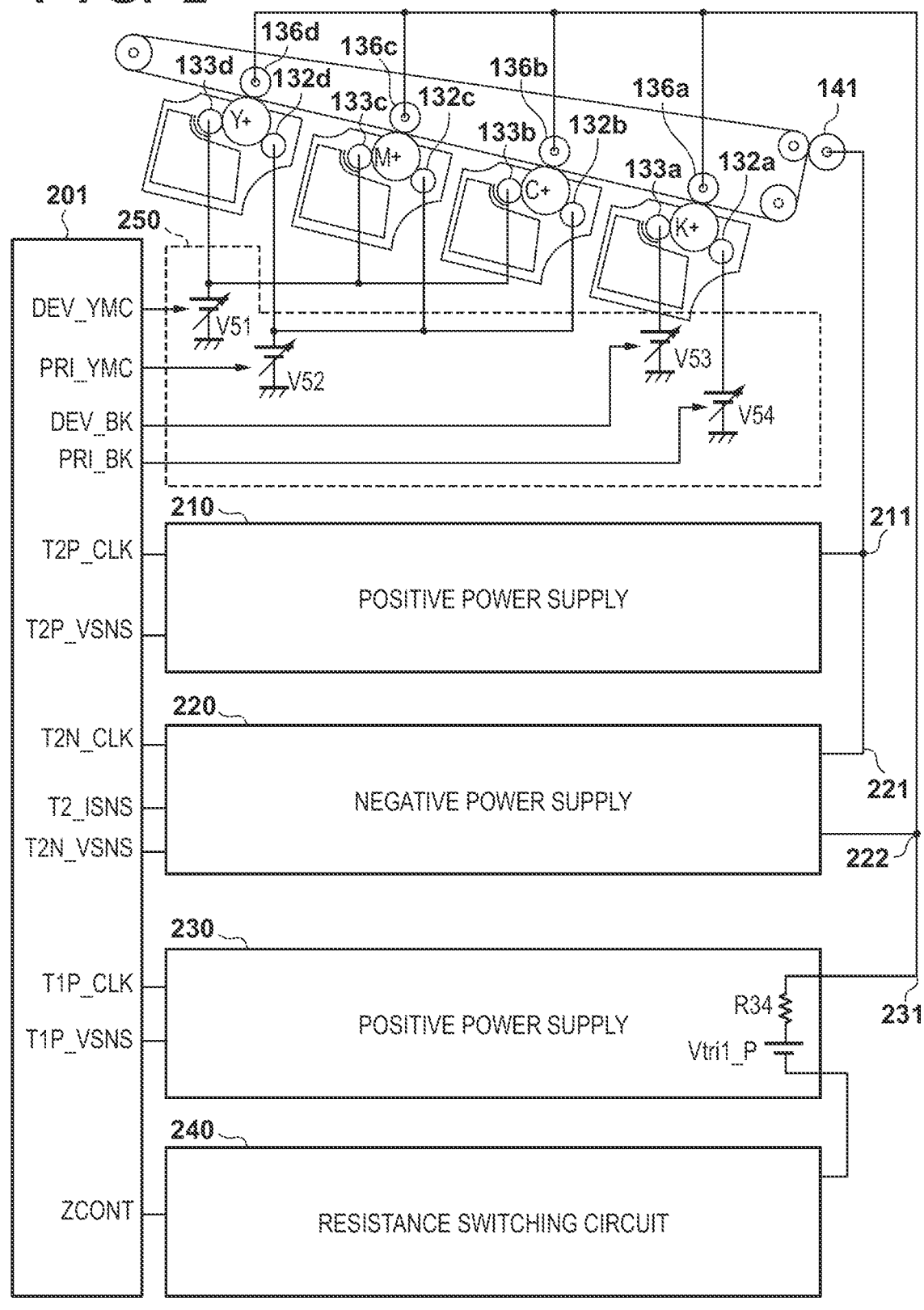
FIG. 2 is a diagram for describing a power supply apparatus.

FIG. 2 is a diagram illustrating a power supply apparatus 200. A control unit 201 is a power supply controller that controls power supplies V51, V52, V53, and V54, positive power supplies 210 and 230, a negative power supply 220, and a resistance switching circuit 240. The control unit 201, for example, is a control circuit implement by a processor (processing circuit) such as a central processing unit (CPU), an application-specific integrated circuit (ASIC), or the like. The power supply V51 generates a development voltage according to a control signal output from a DEV_YMC terminal of the control unit 201 that is applied to the developing rollers 133d, 133c, and 133b. The power supply V52 generates a charging voltage according to a control signal output from a PRI_YMC terminal of the control unit 201 that is applied to the charging rollers 132d, 132c, and 132b. The power supply V53 generates a development voltage according to a control signal output from a DEV_K terminal of the control unit 201 that is applied to the developing roller 133a. The power supply V54 generates a charging voltage according to a control signal output from a PRI_K terminal of the control unit 201 that is applied to the charging roller 132a.

The positive power supply 210 generates a positive voltage Vtri2_P according to a control signal output from a T2P_CLK terminal of the control unit 201 and supplies this to the secondary transfer roller 141. An output terminal 211 of the positive power supply 210 is connected to the secondary transfer roller 141. The positive power supply 210 feeds back a detected voltage proportional to the positive voltage Vtri2_P to a T2P_VSNS terminal of the control unit 201.

The negative power supply 220 generates a negative voltage Vtri2_N according to a control signal output from a T2N_CLK terminal of the control unit 201 and supplies this to the secondary transfer roller 141. An output terminal 221 of the negative power supply 220 is connected to the secondary transfer roller 141. The negative power supply 220 feeds back a detected voltage proportional to the negative voltage Vtri2_N to a T2N_VSNS terminal of the control unit 201. Also, the negative power supply 220 outputs a detected voltage indicating the current flowing through the secondary transfer roller 141 to a T2N_ISNS terminal of the control unit 201. Furthermore, the negative power supply 220 generates a negative voltage Vtri1_N according to a control signal output from a T2N_CLK terminal of the control unit 201 and supplies this to the primary transfer rollers 136a to 136d. The negative voltage Vtri1_N is output from an output terminal 222 of the negative power supply 220.

The positive power supply 230 generates a positive voltage Vtri1_P according to a control signal output from a T1P_CLK terminal of the control unit 201. The positive voltage Vtri1_P is supplied to the primary transfer rollers 136a to 136d via a resistor R34. The resistor R34 forms part of the output resistance (internal resistance). The positive voltage Vtri1_P is output from an output terminal 231 of the positive power supply 230. The positive power supply 230 feeds back a detected voltage proportional to the positive voltage Vtri1_P to a T1P_VSNS terminal of the control unit 201.

The resistance switching circuit 240 is a circuit the controls the output resistance value of the positive power supply 230 according to a control signal output from a ZCONT terminal of the control unit 201. The resistance switching circuit 240 switches the output resistance value of the positive power supply 230 to R34 or Rx (R34<<Rx).

Secondary Transfer Voltage Generation Circuit

Figure 3:
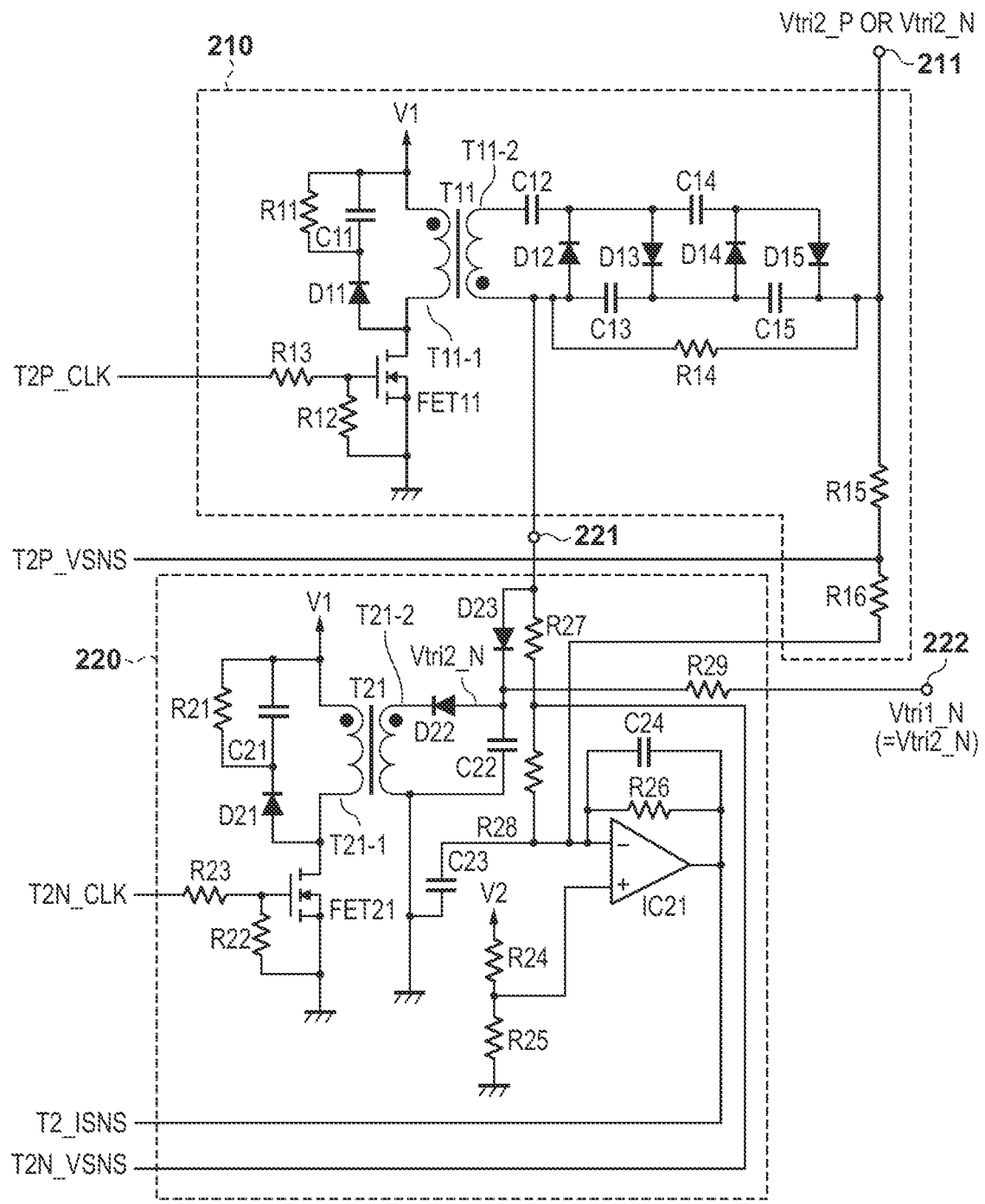
FIG. 3 is a diagram for describing a power supply circuit for secondary transfer.

FIG. 3 is a circuit diagram of the positive power supply 210 that supplies a positive voltage to the secondary transfer roller 141 and the negative power supply 220 that supplies a negative voltage to the secondary transfer roller 141. The positive power supply 210 is formed by a cascade connection of four rectifying and smoothing circuits formed by diodes D12 to D15 and capacitors C12 to C15.

A transformer T11 includes a primary winding T11-1 and a secondary winding T11-2. The turns ratio of the primary winding T11-1 and the secondary winding T11-2 is 1:N. A power supply voltage V1 is connected to one terminal of the primary winding T11-1. The drain terminal of an FET 11 is connected to the other terminal of the primary winding T11-1. FET stands for field effect transistor. A resistor R12 is connected between the gate terminal and the source terminal of the FET 11. The resistor R12 is a noise suppression resistor. A resistor R13 is connected between the gate terminal of the FET 11 and the T2P_CLK terminal of the control unit 201. The resistor R13 is a resistor for protecting the FET 11. The source terminal of the FET 11 is connected to ground (ground potential (GND)). The FET 11 operates by switching according to a drive signal input to the source terminal.

A parallel circuit including a capacitor C11 and a resistor R11 and a diode D11 connected in series with the parallel circuit are connected between the two terminals of the primary winding T11-1.

The four levels of rectifying and smoothing circuits including the diodes D12, D13, D14, and D15 and the capacitors C12, C13, C14, and C15 are connected between the two terminals of the secondary winding T11-2. Each rectifying and smoothing circuit functions as a boost circuit. In the first-level rectifying and smoothing circuit, the anode of the diode D12 is connected to one terminal of the secondary winding T11-2 of the transformer T11. The cathode of the diode D12 is connected to one terminal of the capacitor C12. The other terminal of the capacitor C12 is connected to the other terminal of the secondary winding T11-2.

In the second-level rectifying and smoothing circuit, the anode of the diode D13 is connected to one terminal of the capacitor C12. The cathode of the diode D13 is connected to one terminal of the capacitor C13. The other terminal of the capacitor C13 is connected to one terminal of the secondary winding T11-2.

In the third-level rectifying and smoothing circuit, the anode of the diode D14 is connected to one terminal of the capacitor C13. The cathode of the diode D14 is connected to one terminal of the capacitor C14. The other terminal of the capacitor C14 is connected to one terminal of the capacitor C12.

In the fourth-level rectifying and smoothing circuit, the anode of the diode D15 is connected to one terminal of the capacitor C14. The cathode of the diode D15 is connected to one terminal of the capacitor C15. The other terminal of the capacitor C15 is connected to one terminal of the capacitor C13.

Here, one terminal of the capacitor C15 is connected to the secondary transfer roller 141 via the output terminal 211. One terminal of the capacitor C15 is connected also to an inverting input terminal of an operational amplifier IC21 via a voltage divider circuit including a resistor R15 and a resistor R16. A connection point between the resistor R15 and the resistor R16 is connected to the T2P_VSNS terminal of the control unit 201. In other words, the output voltage occurring at the output terminal 211 is divided by the resistor R15 and the resistor R16, becomes a detected voltage proportional to the output voltage, and is fed back to the control unit 201.

The positive power supply 210 operates as follows. When a Hi state signal is output from the T2P_CLK terminal of the control unit 201, the FET 11 turns on, and the drain voltage of the FET 11 is reduced to approximately GND potential. Accordingly, a forward voltage is applied across both ends of the primary winding T11-1 of the transformer T11, and an excitation current flows. In parallel with this, a forward voltage of N times the forward voltage on the primary side is generated across both ends of the secondary winding T11-2, and the forward voltage is rectified and smoothed by the diode D12 and the capacitor C12.

Next, when the voltage output from the T2P_CLK terminal changes to a Lo state, the FET 11 turns off, and a flyback voltage is generated across both ends of the primary winding T11-1. In parallel with this, a flyback voltage N times that on the primary side is generated across both ends of the secondary winding T11-2. The voltage of the combined flyback voltage generated at the secondary winding T11-2 and the voltage charged at the capacitor C12 is rectified and smoothed at the diode D13 and the capacitor C13. Here, the capacitor C11, the resistor R11, and the diode D11 function as a snubber that absorbs surge voltage generated by leakage inductance of the primary winding T11-1.

Next, the voltage output from the T2P_CLK terminal again changes to a Hi state, and a forward voltage is generated across both ends of the secondary winding T11-2. The forward voltage generated at the secondary winding T11-2 and the voltage charged at the capacitor C13 combined form a total voltage. The total voltage is rectified by the diode D14 and smoothed by the capacitor C14 and the capacitor C12.

Next, when the voltage output from the T2P_CLK terminal again changes to a Lo state, a flyback voltage is generated across both ends of the secondary winding T11-2. The total voltage of the flyback voltage generated at the secondary winding T11-2 and the voltage charged at the capacitor C12 and the capacitor C14 is rectified at the voltage diode D15 and smoothed by the series-connected capacity of the capacitor C15 and the capacitor C13. The voltage generated at one terminal of the capacitor C15 corresponds to the positive voltage Vtri2_P.

Here, a value (detected voltage) of the positive voltage Vtri2_P and the voltage of the inverting input terminal of the operational amplifier IC21 divided at the resistors R15 and R16 is input to the T2P_VSNS terminal. The voltage of the inverting input terminal of the operational amplifier IC21 is the same as the voltage of a non-inverting input terminal with a relationship to a virtual short circuit (a voltage generated by dividing a power supply voltage V2 at the resistors R24 and R25.

In the positive power supply 210, the positive voltage Vtri2_P is generated by repeatedly outputting a Hi/Lo signal from the T2P_CLK terminal. The value of the positive voltage Vtri2_P changes according to the Hi/Lo signal from the T2P_CLK terminal. The control unit 201 controls the Hi/Lo signal output from the T2P_CLK terminal such that the value input to the T2P_VSNS terminal is the desired value. In the present example, the duration of the Hi signal is controlled with the duration of the Lo signal output from the T2P_CLK terminal being fixed. However, this control method is merely one example. Another example of a control method includes controlling the duty ratio of the Hi signal with the period of repeating the Hi signal and the Lo signal being fixed. This control signal or drive signal may also be referred to as a PWM signal. PWM stands for pulse width modulation.

The negative power supply 220 includes a one-level rectifying and smoothing circuit including a diode D22 and a capacitor C22. A transformer T21 includes a primary winding T21-1 and a secondary winding T21-2. The turns ratio of the primary winding T21-1 and the secondary winding T21-2 is 1:M. The power supply voltage V1 is applied to one terminal of the primary winding T21-1. The drain terminal of an FET 21 is connected to the other terminal of the primary winding T21-1. A noise suppression resistor R22 is connected between the gate terminal and the source terminal of the FET 21. Also, a protection resistor R23 is connected between the source terminal and the T2N_CLK terminal of the control unit 201. The source terminal of the FET 21 is connected to GND. A parallel circuit including a capacitor C21 and a resistor R21 and a diode D21 connected in series with the parallel circuit are connected between the two terminals of the primary winding T21-1.

The diode D22 and the capacitor C22 are connected between the two terminals of the secondary winding T21-2. The cathode of the diode D22 is connected to one terminal of the secondary winding T21-2 of the transformer T21. The anode of the diode D22 is connected to one terminal of the capacitor C22. The other terminal of the capacitor C22 is connected to the other terminal of the secondary winding T21-2 and GND.

One terminal of the capacitor C22 is further connected to the cathode of a diode D23. The anode of the diode D23 is connected to one terminal of the secondary winding T11-2 of the transformer T11 of the positive power supply 210. The anode of the diode D23 is connected also to the inverting input terminal of the operational amplifier IC21 via a series-connected circuit of a resistor R27 and a resistor R28. A connection point between the resistor R27 and the resistor R28 is connected to the T2N_VSNS terminal of the control unit 201. The negative voltage Vtri2_N generated by the negative power supply 220 is divided by the resistor R27 and the resistor R28, becomes a detected voltage, and is fed back to the T2N_VSNS terminal.

The inverting input terminal of the operational amplifier IC21 is connected to GND via a capacitor C23. A resistor R26 and a capacitor C24 are connected in parallel between the inverting input terminal of the operational amplifier IC21 and the output terminal of the operational amplifier IC21. The output terminal of the operational amplifier IC21 is connected to a T2_ISNS terminal of the control unit 201. A connection point between the resistor R24 and the resistor R25 is connected to the non-inverting input terminal of the operational amplifier IC21. The power supply voltage V2 is divided at the resistor R24 and the resistor R25 and applied to the non-inverting input terminal of the operational amplifier IC21. The operational amplifier IC21, the resistor R26, and the capacitor C24 form a current detection circuit that detects a current in the secondary transfer roller 141.

The negative power supply 220 operates as follows. When a Hi state signal is output from the T2N_CLK terminal of the control unit 201, the FET 21 turns on, and the drain potential of the FET 21 is reduced to approximately GND potential. Accordingly, a voltage is applied across both ends of the primary winding T21-1 of the transformer T21, and an excitation current flows. In parallel with this, a forward voltage of M times the forward voltage on the primary side is generated across both ends of the secondary winding T21-2.

Next, when the voltage output from the T2N_CLK terminal changes to a Lo state, the FET 21 turns off, and a flyback voltage is generated across both ends of the primary winding T21-1. In parallel with this, a flyback voltage of M times the flyback voltage on the primary side is generated across both ends of the secondary winding T21-2. The flyback voltage is rectified and smoothed at the diode D22 and the capacitor C22. Here, the capacitor C21, the resistor R21, and the diode D21 function as a snubber that absorbs surge voltage generated by leakage inductance of the primary winding T21-1. The voltage of one terminal of the capacitor C22 corresponds to the negative voltage Vtri2_N, which is the negative secondary transfer voltage.

The negative voltage Vtri2_N is applied to the other terminal of the secondary winding T11-2 of the transformer T11 via the diode D23. Here, a value of the voltage of the anode of the diode D23 and the voltage of the inverting input terminal of the operational amplifier IC21 divided at the resistors R27 and R28 is input to the T2N_VSNS terminal. The negative voltage Vtri2_N is connected to the primary transfer rollers 136a, 136b, 136c, and 136d via a resistor R29. In other words, the negative voltage Vtri2_N is supplied to not only the secondary transfer roller 141 but also to the primary transfer rollers 136a, 136b, 136c, and 136d. For the sake of convenience, the negative voltage supplied to the primary transfer rollers 136a, 136b, 136c, and 136d is denoted as Vtri1_N.

In the negative power supply 220, the negative voltage Vtri2_N is generated by repeatedly outputting a Hi/Lo signal from the T2N_CLK terminal. The value of the negative voltage Vtri2_N changes according to the Hi/Lo signal from the T2N_CLK terminal. The control unit 201 controls the Hi/Lo signal output from the T2N_CLK terminal such that the value input to the T2N_VSNS terminal is the desired value. In the present example, the duration of the Hi signal is controlled with the duration of the Lo signal output from the T2N_CLK terminal being fixed.

Also, the operational amplifier IC21 is provided to detect the current value supplied to the secondary transfer roller 141. The current supplied to the secondary transfer roller 141 from one terminal of the capacitor C15 flows through the frame (=GND) of the image forming apparatus 101 and returns to the other terminal of the capacitor C13 from the operational amplifier IC21 via the resistor R26, the resistor R28, and the resistor R27. In other words, the value obtained via voltage conversion of the current flowing through the resistor R26 is input to the T2_ISNS terminal. The diode D23 prevents the current supplied from another positive power supply 230 described below from flowing into the current detection circuit including the operational amplifier IC21.

As illustrated in FIG. 3, the positive power supply 210 and the negative power supply 220 are in a series-connected relationship. The control unit 201 operates the positive power supply 210 to generate the positive voltage Vtri2_P, which is the positive primary transfer voltage, and supplies this to the secondary transfer roller 141. Also, the control unit 201 operates the negative power supply 220 to generate the negative voltage Vtri2_N and supplies this to the secondary transfer roller 141. As illustrated in FIG. 3, a resistor R14 is disposed between the output terminal 221 and the secondary transfer roller 141. Thus, the negative voltage Vtri2_N is divided by the resistor R14 and the resistance value of the secondary transfer roller 141 and applied to the secondary transfer roller 141.

Primary Transfer Voltage Generation Circuit

As illustrated in FIG. 2, the primary transfer rollers 136*a*, 136*b*, 136*c*, and 136*d* are supplied with the positive voltage Vtri1_P via the positive power supply 230. The primary transfer rollers 136*a*, 136*b*, 136*c*, and 136*d* are supplied with the negative voltage Vtri1_N via the negative power supply 220. The positive power supply 230 and the negative power supply 220 are connected in parallel. The negative power supply 220 supplies a voltage (the negative voltages Vtri1_N and Vtri2_N) to the primary transfer rollers 136*a*, 136*b*, 136*c*, and 136*d* and the secondary transfer roller 141.

As illustrated in FIG. 4, the positive power supply 230 includes a one-level rectifying and smoothing circuit including a diode D32 and a capacitor C32. A transformer T31 includes a primary winding T31-1 and a secondary winding T31-2. The turns ratio of the primary winding T31-1 and the secondary winding T31-2 is L. The power supply voltage V1 is applied to one terminal of the primary winding T31-1. The drain terminal of an FET 31 is connected to the other terminal of the primary winding T31-1. A protection resistor R33 is connected between the gate terminal of the FET 31 and a T1_CLK terminal of the control unit 201. A noise suppression resistor R32 is connected between the gate terminal and the source terminal of the FET 31. The source terminal of the FET 31 is connected to GND. A parallel circuit including a capacitor C31 and a resistor R31 and a diode D31 connected in series with the parallel circuit are connected between the two terminals of the primary winding T31-1.

The diode D32 and the capacitor C32 are connected between the two terminals of the secondary winding T31-2. The cathode of the diode D32 is connected to one terminal of the secondary winding T31-2 of the transformer T31. The anode of the diode D32 is connected to one terminal of the capacitor C32. The other terminal of the capacitor C32 is connected to the other terminal of the secondary winding T31-2. One terminal of the capacitor C32 is connected to the primary transfer rollers 136*a*, 136*b*, 136*c*, and 136*d* via the resistor R34. One terminal of the capacitor C32 is also connected to GND via a series-connected circuit including a resistor R35 and a resistor R36. A connection point between the resistor R35 and the resistor R36 is connected to the T1N_VSNS terminal of the control unit 201. Accordingly, the detected voltage T1P_VSNS proportional to the positive voltage Vtri1_P is fed back to the control unit 201.

The positive power supply 230 operates as follows. When a Hi state signal is output from the T1_CLK terminal of the control unit 201, the FET 31 turns on, and the drain voltage of the FET 31 is reduced to approximately the same potential as GND. Accordingly, a voltage is applied across both ends of the primary winding T31-1 of the transformer T31, and an excitation current flows through the primary winding T31-1. In parallel with this, a forward voltage of L times the forward voltage on the primary side is generated across both ends of the secondary winding T31-2.

Next, when the voltage output from the T1_CLK terminal changes to a Lo state, the FET 31 turns off, and a flyback voltage is generated across both ends of the primary winding T31-1. In parallel with this, a flyback voltage of L times the flyback voltage on the primary side is generated across both ends of the secondary winding T31-2. The flyback voltage is rectified and smoothed at the diode D32 and the capacitor C32. Here, the capacitor C31, the resistor R31, and the diode D31 function as a snubber that absorbs surge voltage generated by leakage inductance of the primary winding T31-1. The voltage of one terminal of the capacitor C32 corresponds to the positive voltage Vtri1_P, which is the primary transfer voltage.

As illustrated in FIG. 4, the resistance switching circuit 240 includes the function of switching the output resistance of the positive power supply 230 to the primary transfer rollers 136*a*, 136*b*, 136*c*, and 136*d*. The resistance switching circuit 240 includes three PNP type transistors TR42, TR43, and TR44. The collector terminal of the transistor TR42 is connected to the emitter terminal of the transistor TR43. The collector terminal of the transistor TR43 is connected to the emitter terminal of the transistor TR44. In other words, the transistors TR42, TR43, and TR44 form a series circuit. The emitter terminal of the transistor TR42 is connected to the power supply voltage V1. The collector terminal of the transistor TR44 is connected to the other terminal of the secondary winding T31-2. A resistor R43 is connected between the emitter terminal and the base terminal of the transistor TR42. A resistor R45 is connected between the emitter terminal of the transistor TR42 and the base terminal of the transistor TR43. A resistor R47 is connected between the base terminal of the transistor TR43 and the base terminal of the transistor TR44. A resistor R49 is connected between the base terminal and the collector terminal of the transistor TR43.

The base terminal of the transistor TR42 is connected to the collector terminal of a NPN type transistor TR41 via a resistor R44. The base terminal of the transistor TR43 is connected to the collector terminal of the transistor TR41 via a resistor R46 and a diode D41. The base terminal of the transistor TR44 is connected to the collector terminal of the transistor TR41 via a resistor R48 and a diode D42. A noise suppression resistor R42 is connected between the base terminal and the emitter terminal of the transistor TR41. The base terminal of the transistor TR41 is connected to the ZCONT terminal of the control unit 201 via a protection resistor R41. The emitter terminal of the transistor TR41 is connected to GND.

The resistance switching circuit 240 operates as follows. When a Hi level control signal is output from the ZCONT terminal of the control unit 201, the transistor TR41 turns on, and a collector current flows through the transistor TR41. Accordingly, the transistors TR42, TR43, and TR44 turn on. In this state, the output resistance of the positive power supply 230 corresponds to the resistor R34. The positive voltage Vtri1_P generated by the positive power supply 230 is supplied to the primary transfer rollers 136a, 136b, 136c, and 136d via the resistor R34. Also, as illustrated in FIG. 2, the output terminal 231 of the positive power supply 230 and the output terminal 222 of the negative power supply 220 are connected. Thus, as illustrated in FIG. 3, the positive voltage Vtri1_P is connected to GND via the resistor R34, the resistor R29, and the diode D22. Here, the resistance value of primary transfer rollers 136a, 136b, 136c, and 136d is assumed to be sufficiently large. In this case, the voltage applied to the primary transfer rollers 136a, 136b, 136c, and 136d corresponds to approximately the value of the positive voltage Vtri1_P divided at the resistor R34 and the resistor R29. This is because the connection point between the resistor R34 and the resistor R29 is the output terminal 231.

Next, when a Lo level control signal is output from the ZCONT terminal of the control unit 201, the transistor TR41 turns off. Accordingly, the transistors TR42, TR43, and TR44 turn off. The output resistance of the positive power supply 230 in this state corresponds to the resistor R45, the resistor R47, and the resistor R49 added to the resistor R34. The voltage applied to the primary transfer rollers 136a, 136b, 136c, and 136d corresponds to approximately the value of the positive voltage Vtri1_P divided at the resistor R34+R45+R47+R49 and the resistor R29.

In the present example, each resistance value is selected such that resistor R34<<resistor R29 and resistor R29<<R45+R47+R49 are satisfied. Thus, when the ZCONT terminal is a Hi level, the voltage applied to the primary transfer rollers 136a, 136b, 136c, and 136d corresponds to approximately the positive voltage Vtri1_P. Conversely, when the ZCONT terminal is a Lo level, the voltage applied to the primary transfer rollers 136a, 136b, 136c, and 136d corresponds to a value close to zero.

FIG. 5 illustrates the relationship between the control signal output by the control unit 201 and the voltage applied to the primary transfer rollers 136a, 136b, 136c, and 136d. When the T1P_CLK terminal is set to on, a control signal is output. When the T1P_CLK terminal is set to off, the output of the control signal from the T1P_CLK terminal is stopped. In a similar manner, when the T2N_CLK terminal is set to on, a control signal is output from the T2N_CLK terminal. When the T2N_CLK terminal is set to off, the output of the control signal from the T2N_CLK terminal is stopped.

In a case where a positive voltage is applied to the primary transfer rollers 136a, 136b, 136c, and 136d, the ZCONT terminal is set to the Hi level. The T1P_CLK terminal is set to on. The T2N_CLK terminal may be set to either off or on. In this manner, the output resistance of the positive power supply 230 corresponds to the resistor R34. The output resistance of the negative power supply 220 corresponds to the resistor R29. The voltage applied to the primary transfer rollers 136a, 136b, 136c, and 136d is represented by the following formula.

$$\frac{V_{tri1\_P} - \frac{R34}{R29} \times V_{tri2\_N}}{\frac{R34}{R29} + 1} \quad (1)$$

Note that in the present specification, the reference signs assigned to the resistors indicated the resistance value. When the resistance value is selected such that resistor R34<<resistor R29 is satisfied, Formula (1) approaches the positive voltage Vtri1_P. In other words, the desired positive voltage is applied to the primary transfer rollers 136a, 136b, 136c, and 136d without the positive power supply 230 generating a voltage higher than necessary. Also, irrespective of the operation state of the negative power supply 220, the desired positive voltage is applied to the primary transfer rollers 136a, 136b, 136c, and 136d. In other words, even when the negative voltage Vtri1_N is applied to the secondary transfer roller 141, the desired positive voltage is applied to the primary transfer rollers 136a, 136b, 136c, and 136d.

In a case where a negative voltage is applied to the primary transfer rollers 136a, 136b, 136c, and 136d, the ZCONT terminal is set to the Lo level. The T1P_CLK terminal is set to off. The T2N_CLK terminal is set to on. At this time, the output resistance of the positive power supply 230 corresponds to R34+R45+R47+R49 (=Rx). The output resistance of the negative power supply 220 corresponds to R29. The voltage applied to the primary transfer rollers 136a, 136b, 136c, and 136d is represented by the following formula.

$$\frac{1}{\frac{R29}{Rx} + 1} \times V_{tri2\_N} \quad (2)$$

When the resistance values are selected such that resistor R29<<resistor Rx is satisfied, Formula (2) approaches the negative voltage Vtri2_N(=Vtri1_N). In other words, the desired negative voltage is applied to the primary transfer rollers 136a, 136b, 136c, and 136d without the negative power supply 220 generating a voltage higher than necessary.

When the voltage applied to the primary transfer rollers 136a, 136b, 136c, and 136d is switched from positive to negative, after the control signal of the T1P_CLK terminal is turned off, the control unit 201 sets the control signal from the ZCONT terminal to Lo. Furthermore, the control unit 201 turns on the control signal from the T2N_CLK terminal. Take an example where the control signal from the T1P_CLK terminal remains on, the control signal of the ZCONT terminal is set to Lo, and the control signal from the T2N_CLK terminal is turned on. In this example, the voltage applied to the transistors TR42, TR43, and TR44 exceeds a withstand voltage. This is because the voltage applied to the emitter terminal of the transistor TR44 corresponds to a voltage equal to or significantly higher than a voltage obtained by subtracting the voltage (charged voltage) across both ends of the capacitor C32 from the negative voltage.

A similar timing control is required when the polarity of the voltage applied to the primary transfer rollers 136a, 136b, 136c, and 136d is switched from negative to positive. In other words, after the control signal of the ZCONT terminal is set to Hi and the control signal of the T2N_CLK terminal is turned off, the control unit 201 turns on the control signal of the T1P_CLK terminal.

Second Embodiment

In the first embodiment, the three transistors TR42 to TR44 are connected in series, but it is sufficient that the number of transistors is one or more. The number of PNP type transistors connected in series may be decided such that the voltage applied to the transistor does not exceed a rate voltage, the transistors can be mounted in the space on the substrate, and the manufacturing cost does not exceed the desired cost.

Figure 6A:
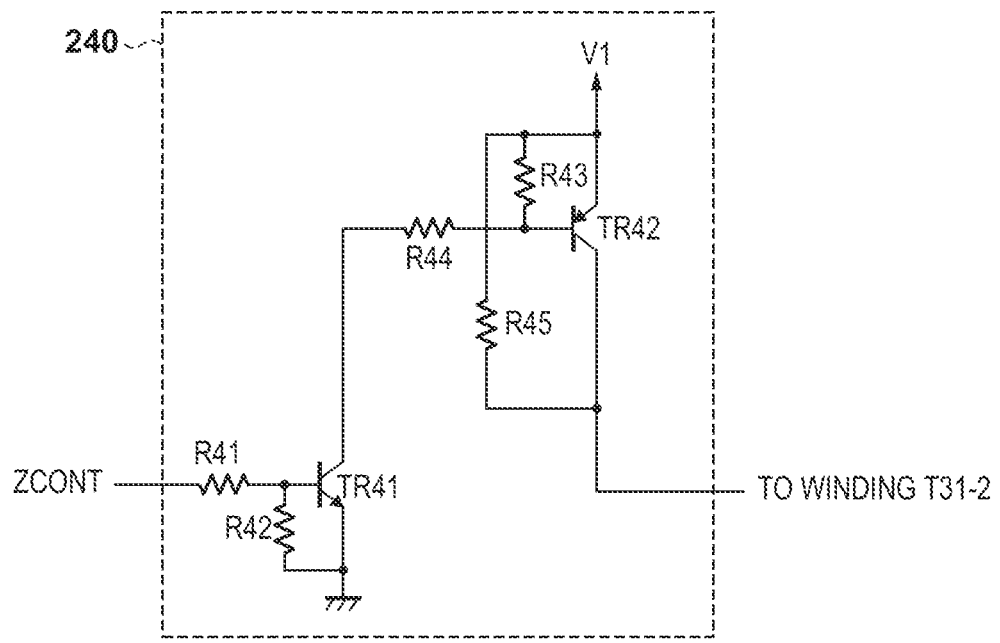
FIG. 6A is a diagram for describing a modified example of the resistance switching circuit.

FIG. 6A illustrates how the resistance switching circuit 240 can be implemented with the one PNP type transistor TR42. The emitter terminal of the transistor TR42 is connected to the power supply voltage V1 and one terminal of the resistor R43. The resistor R43 is connected between the emitter terminal and the base terminal of the transistor TR42. The resistor R44 is connected between the base terminal of the transistor TR42 and the collector terminal of the transistor TR41. The resistor R45 is connected between the emitter terminal and the collector terminal of the transistor TR42. When the control signal output from the ZCONT terminal is turned off and the transistor TR42 is turned off, the output resistance corresponds to resistor Rx=R34+R45. Here, when R29<<Rx is established, the voltage applied to the primary transfer rollers 136a, 136b, 136c, and 136d corresponds to the negative voltage Vtri1_N (=Vtri2_N). On the other hand, when the control signal output from the ZCONT terminal is turned on and the transistor TR42 is turned on, the output resistance corresponds to R34. The voltage applied to the primary transfer rollers 136a, 136b, 136c, and 136d corresponds to the positive voltage Vtri1_P.

Figure 6B:
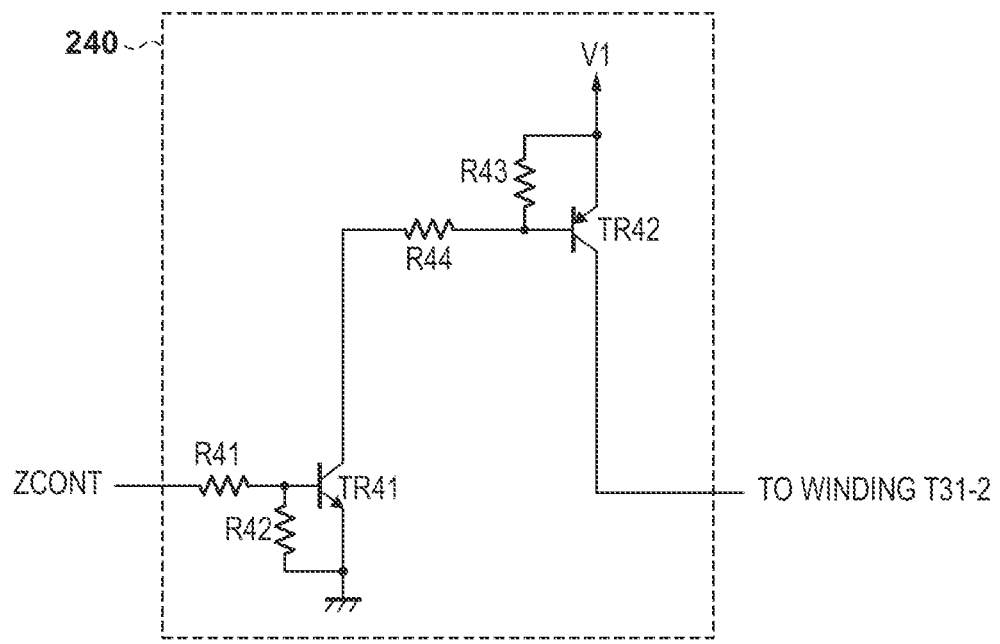
FIG. 6B is a diagram for describing a modified example of the resistance switching circuit.

FIG. 6B illustrates how the resistor R45 can be omitted from the resistance switching circuit 240 illustrated in FIG. 6A. In this case, when the transistor TR42 is turned off (opened), the emitter-collector resistance of the transistor TR42 corresponds to an extremely high resistance. In other words, the emitter-collector resistance may function as the resistor R45.

In this manner, if the withstand voltage of the transistor TR42 is sufficiently high, the number of PNP type transistors required for the resistance switching circuit 240 can be reduced. In this manner, more space can be left on the substrate.

Third Embodiment

In the first and second embodiment, toner charged with negative polarity is used. However, toner charged with positive polarity may be used. In this case, the polarity of the voltage applied to each component also needs to be reversed. In the third embodiment, the elements that are the same or equivalent to those in the first and second embodiment are given the same reference sign, and the description of the first and second embodiment is incorporated by reference.

Figure 7:
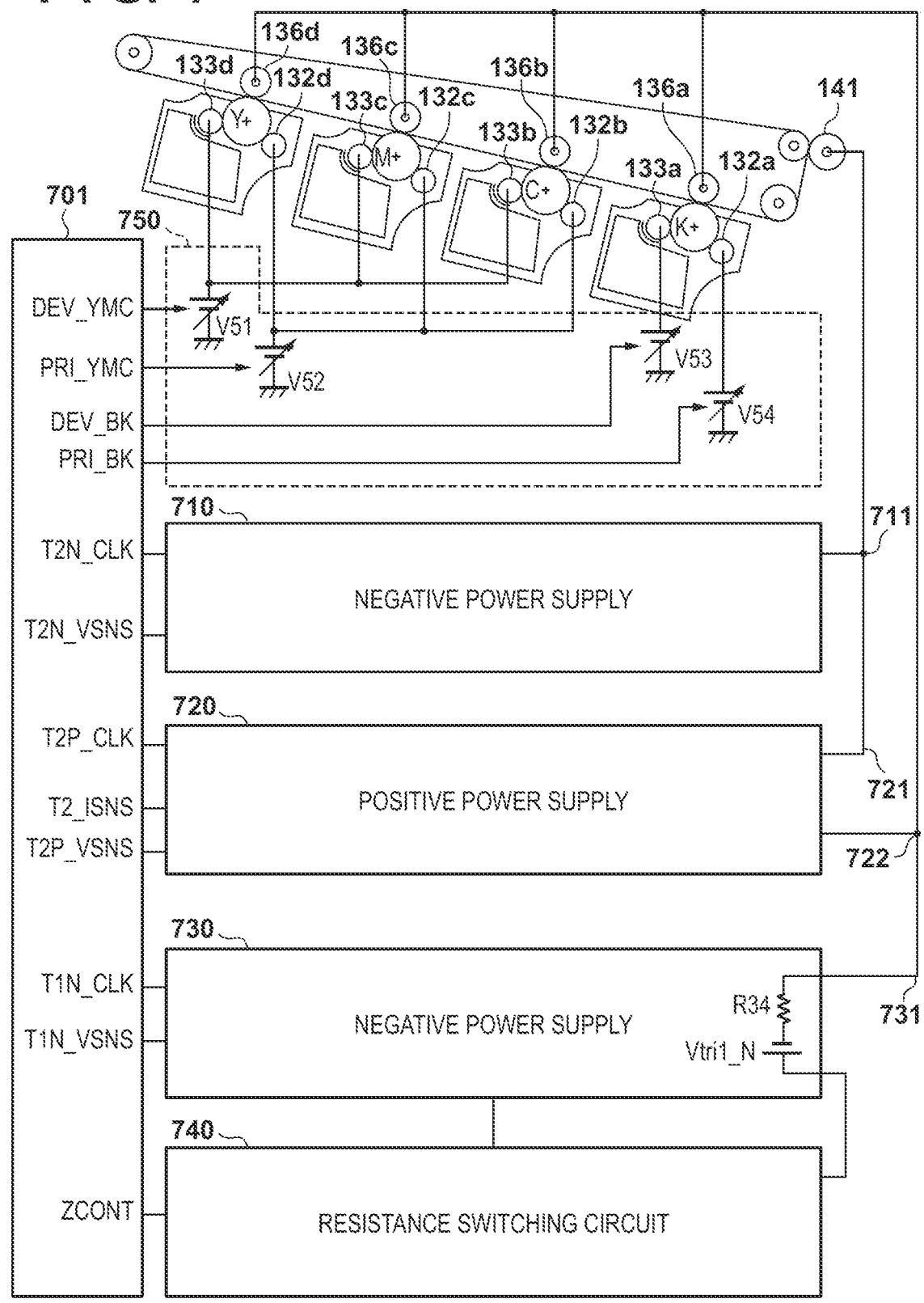
FIG. 7 is a diagram for describing another example of the power supply apparatus.

FIG. 7 is a diagram illustrating a power supply apparatus 700 according to the third embodiment. A control unit 701 is a power supply controller that controls the power supplies V51, V52, V53, and V54, negative power supplies 710 and 730, a positive power supply 720, and a resistance switching circuit 740. The power supply V51 generates a positive polarity development voltage according to a control signal output from a DEV_YMC terminal of the control unit 701 that is applied to the developing rollers 133d, 133c, and 133b. The power supply V52 generates a positive polarity charging voltage according to a control signal output from the PRI_YMC terminal of the control unit 701 that is applied to the charging rollers 132d, 132c, and 132b. The power supply V53 generates a positive polarity development voltage according to a control signal output from the DEV_K terminal of the control unit 701 that is applied to the developing roller 133a. The power supply V54 generates a positive polarity charging voltage according to a control signal output from the PRI_K terminal of the control unit 701 that is applied to the charging roller 132a.

The negative power supply 710 generates the negative voltage Vtri2_N according to a control signal output from the T2N_CLK terminal of the control unit 701 and supplies this to the secondary transfer roller 141. An output terminal 711 of the negative power supply 710 is connected to the secondary transfer roller 141. The negative power supply 710 feeds back a detected voltage proportional to the negative voltage Vtri2_N to the T2N_VSNS terminal of the control unit 701.

The positive power supply 720 generates a positive voltage Vtri2_P according to a control signal output from the T2P_CLK terminal of the control unit 701 and supplies this to the secondary transfer roller 141. An output terminal 721 of the positive power supply 720 is connected to the secondary transfer roller 141. The positive power supply 720 feeds back a detected voltage proportional to the positive voltage Vtri2_P to the T2N_VSNS terminal of the control unit 701. Also, the positive power supply 720 outputs a detected voltage indicating the current flowing through the secondary transfer roller 141 to a T2P_ISNS terminal of the control unit 701. Furthermore, the positive power supply 720 generates the positive voltage Vtri1_P according to a control signal output from the T2P_CLK terminal of the control unit 701 and supplies this to the primary transfer rollers 136a to 136d. The positive voltage Vtri1_P is output from an output terminal 722 of the positive power supply 720.

The negative power supply 730 generates the negative voltage Vtri1_N according to a control signal output from a T1N_CLK terminal of the control unit 701 and supplies this to the primary transfer rollers 136a to 136d. The negative voltage Vtri1_N is output from an output terminal 731 of the negative power supply 730. The negative power supply 730 feeds back a detected voltage proportional to the negative voltage Vtri1_N to a T1N_VSNS terminal of the control unit 701.

The resistance switching circuit 740 is a circuit the controls the output resistance value of the negative power supply 730 according to a control signal output from the ZCONT terminal of the control unit 701.

Figure 8:
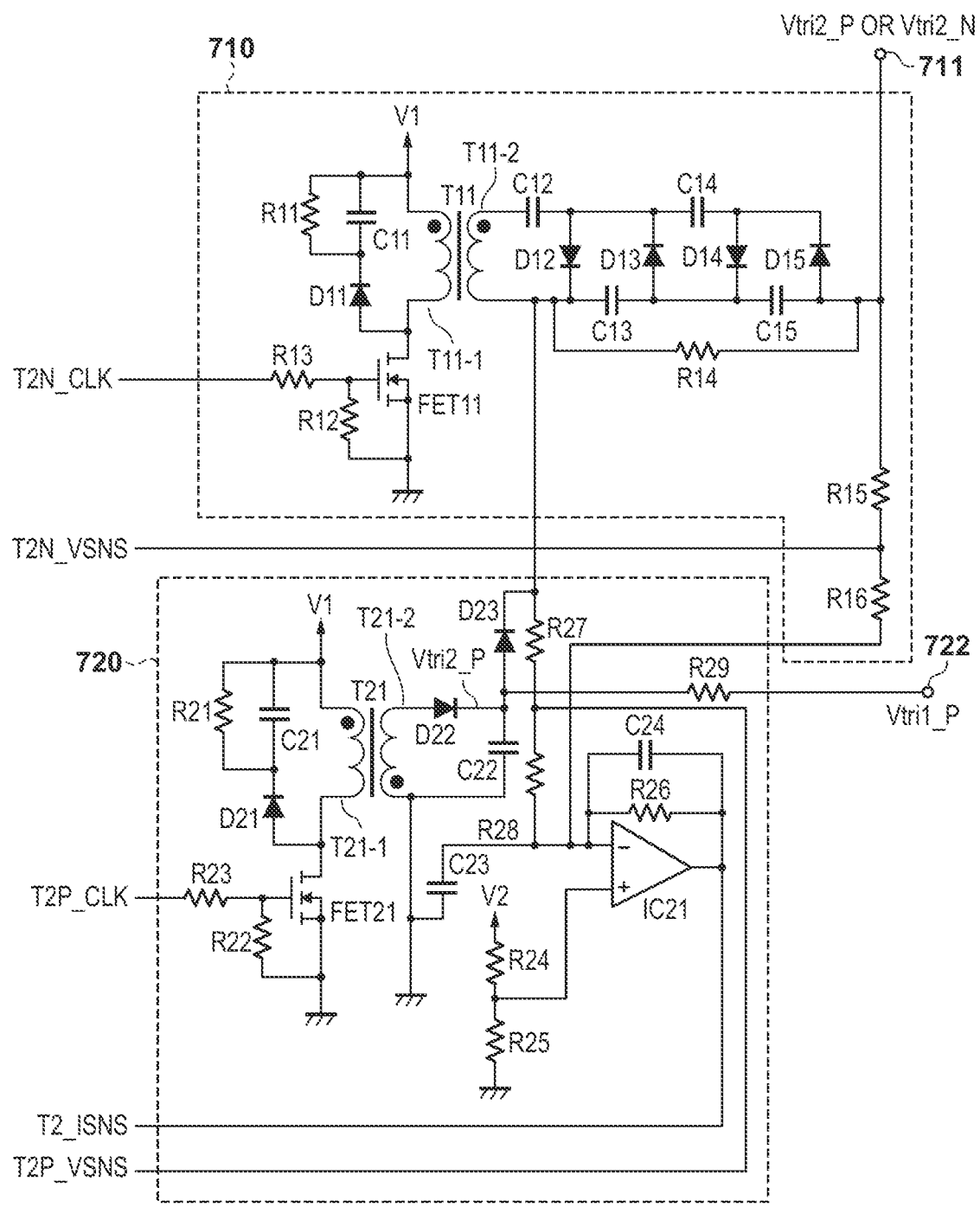
FIG. 8 is a diagram for describing another example of the power supply circuit for secondary transfer.

FIG. 8 is a circuit diagram of the negative power supply 710 and the positive power supply 720. The secondary side circuit configuration of the transformer T11 and the secondary side circuit configuration of the transformer T21 are different in FIG. 8 compared to FIG. 3. In other words, the polarity of the electrical elements with polarity (the secondary windings T11-2 and T21-2 and the diodes D12 to D15, D22, and D23) is reversed. In other words, FIG. 8 can be described by substituting anode and cathode with one another in the description relating to FIG. 3 above. Accordingly, the circuit configuration and operation of the negative power supply 710 is similar to the circuit configuration and operation of the positive power supply 210, with only the polarity of the output voltage being different. The circuit configuration and operation of the positive power supply 720 is similar to the circuit configuration and operation of the negative power supply 220, with only the polarity of the output voltage being different.

Figure 9:
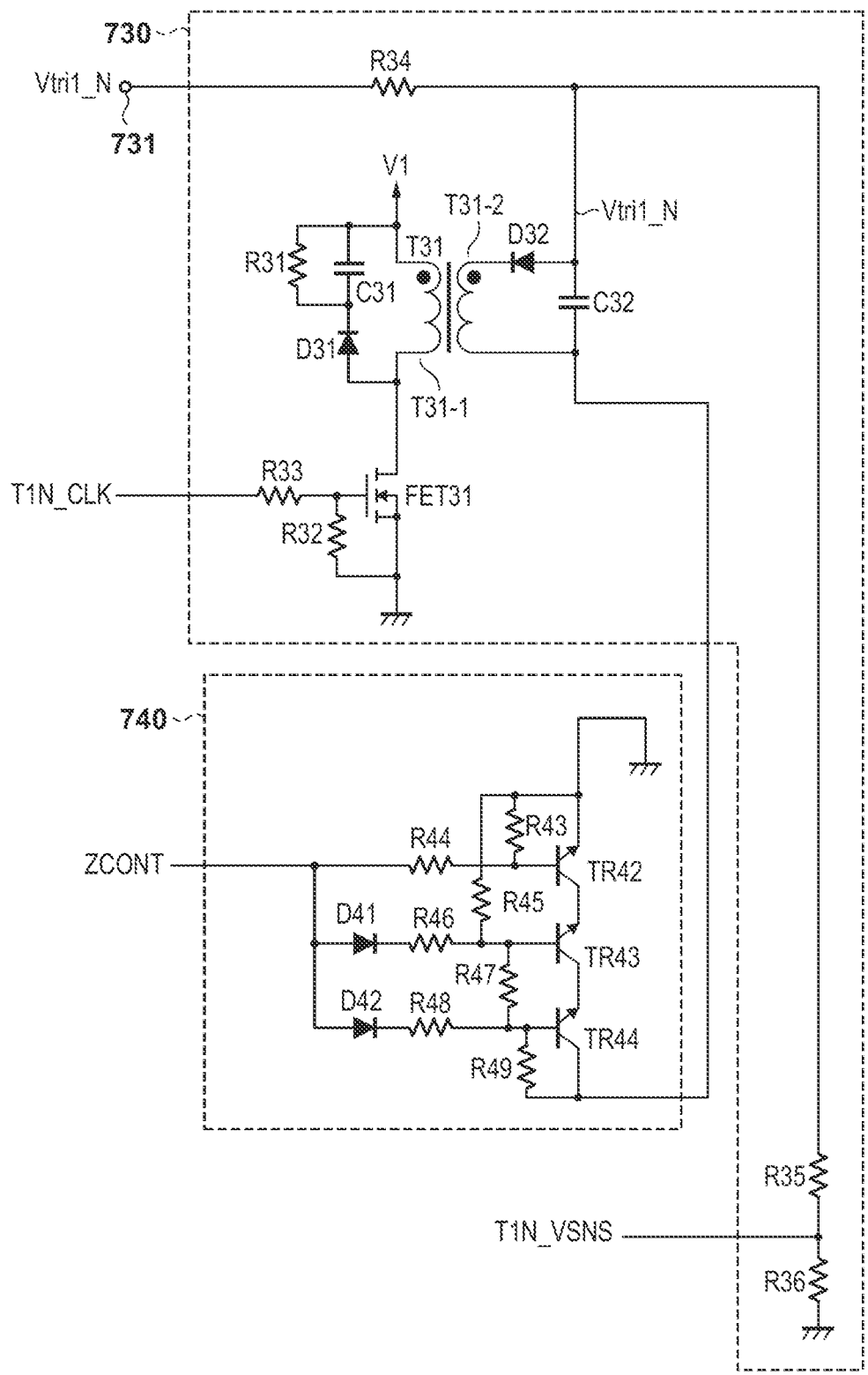
FIG. 9 is a diagram for describing another example of a negative power supply for primary transfer and the resistance switching circuit.

FIG. 9 is a circuit diagram of the negative power supply 730 and the resistance switching circuit 740. The circuit configuration on the secondary side of the transformer T31 is different in FIG. 9 compared to FIG. 4. In other words, the polarity of the electrical elements with polarity (the secondary winding T31-2 and the diode D32) is reversed. In other words, FIG. 9 can be described by substituting anode and cathode with one another in the description relating to FIG. 4 above. Accordingly, the operation principle of the negative power supply 730 is basically the same as the operation principle of the positive power supply 230, with only the polarity of the output voltage being different.

The difference between the resistance switching circuit 740 and the resistance switching circuit 240 is that the polarity of the electrical elements with polarity (the transistors TR42, TR43, and TR44 and the diodes D41 and D42) are reversed. The resistance switching circuit 740 in FIG. 9 can be described by swapping the collectors and the emitters and the anodes and the cathodes in the description of the resistance switching circuit 240 in FIG. 4. Note that NPN type transistors are used for the transistors TR42, TR43, and TR44. Note that in the resistance switching circuit 240, the transistor TR41 used as an auxiliary is omitted. In other words, the control unit 201 directly controls the transistors TR42, TR43, and TR44.

When the control signal output from the ZCONT terminal is turned off and the transistors TR42, TR43, and TR44 are turned off, the output resistance corresponds to resistor Rx=R34+R45+R47+R49. Here, when R29<<Rx is established, the voltage applied to the primary transfer rollers 136a, 136b, 136c, and 136d corresponds to the positive voltage Vtri1_P (=Vtri2_P). On the other hand, when the control signal output from the ZCONT terminal is turned on and the transistors TR42, TR43, and TR44 are turned on, the output resistance corresponds to R34. Accordingly, the voltage applied to the primary transfer rollers 136a, 136b, 136c, and 136d corresponds to the negative voltage Vtri1_N output from the negative power supply 730.

In this manner, the polarity of the power supplies may be inverted according to the polarity of the toner. In other words, the control unit 701 controls the power supply apparatus 700 such that a positive voltage is applied to the charging roller 132 and the developing roller 133. The control unit 701 controls the power supply apparatus 700 such that a negative voltage is applied to the primary transfer roller 136 and the secondary transfer roller 141 during printing. The control unit 701 controls the power supply apparatus 700 such that a positive voltage is applied to the primary transfer roller 136 and the secondary transfer roller 141 during a special sequence such as cleaning.

Fourth Embodiment

In the fourth embodiment, where the resistance switching circuits are disposed is different from in the first embodiment. In the fourth embodiment, only the differences from the first embodiment are described, and the description of the first embodiment is incorporated by reference for sections that are the same as in the first embodiment.

Figure 10:
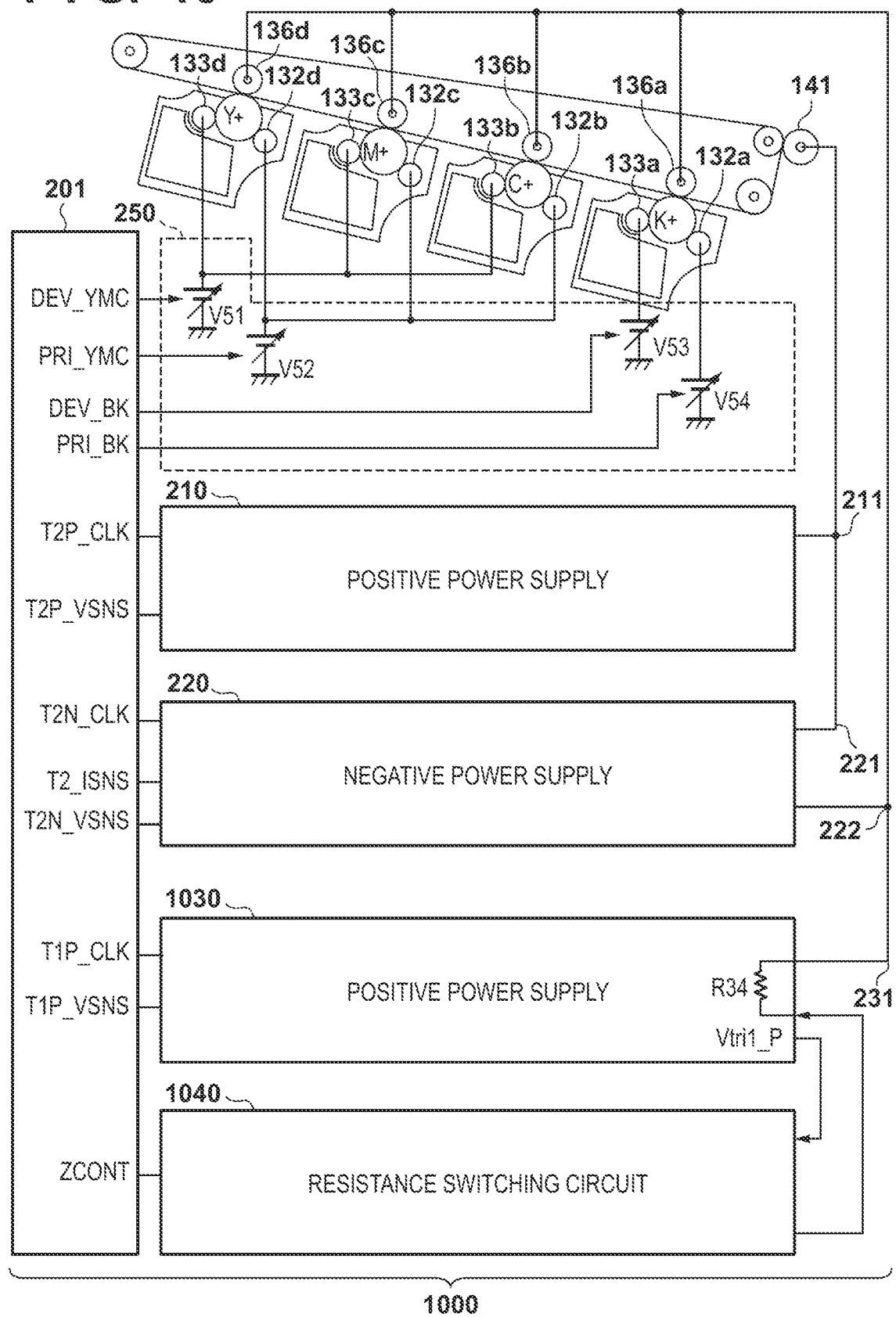
FIG. 10 is a diagram for describing another example of the power supply apparatus.

FIG. 10 illustrates a power supply apparatus 1000 according to the fourth embodiment. In the power supply apparatus 1000, a resistance switching circuit 1040 is disposed between a positive power supply 1030 and the resistor R34. In other words, the resistance switching circuit 1040 switches the output resistance of the positive power supply 1030 to R34 or Rx according to the control signal output from the ZCONT terminal.

Figure 11:
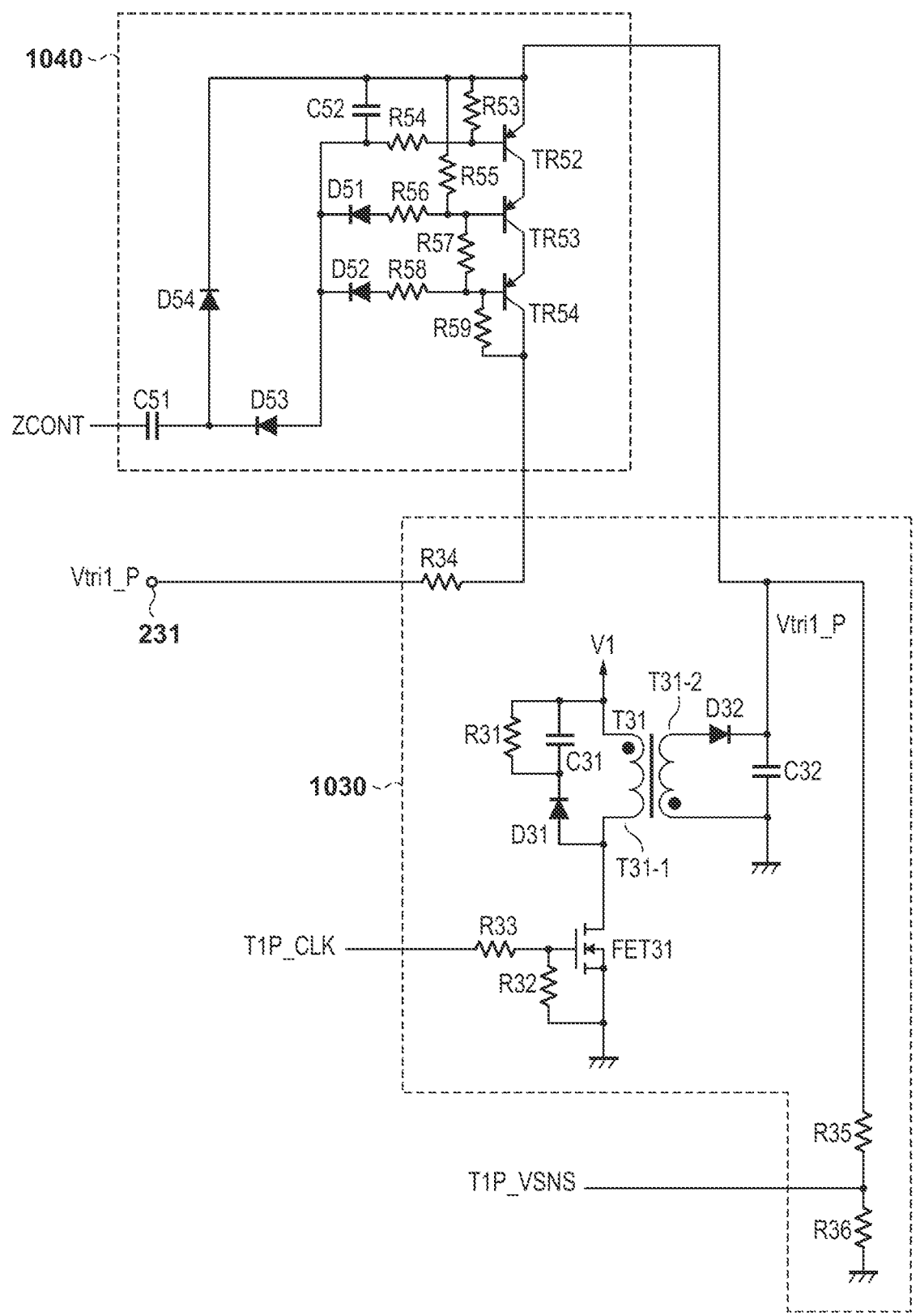
FIG. 11 is a diagram for describing the positive power supply for primary transfer and the resistance switching circuit.

FIG. 11 is a circuit diagram of the positive power supply 1030 and the resistance switching circuit 1040. The positive power supply 1030 is different from the positive power supply 230 according to the first embodiment on two points. The first is that one terminal of the capacitor C32 is connected to the primary transfer rollers 136a, 136b, 136c, and 136d via the resistance switching circuit 1040 and the resistor R34. The second is that the other terminal of the capacitor C32 is connected to GND. Other than these points, the description of the first embodiment is incorporated by reference.

The resistance switching circuit 1040 is used instead of the resistance switching circuit 240. The resistance switching circuit 1040 includes the function of switching the output resistance of the positive power supply 1030 to the primary transfer rollers 136a, 136b, 136c, and 136d.

The resistance switching circuit 1040 includes three PNP type transistors TR52, TR53, and TR54 connected in series. The collector terminal of the transistor TR52 and the emitter terminal of the transistor TR53 are connected. The collector terminal of the transistor TR53 and the emitter terminal of the transistor TR54 are connected. The emitter terminal of the transistor TR52 is connected to the positive voltage Vtri1_P. The collector terminal of the transistor TR54 is connected to the resistor R34. A resistor R53 and a capacitor C52 are connected between the emitter terminal and the base terminal of the transistor TR52. A resistor R55 is connected between the emitter terminal of the transistor TR52 and the base terminal of the transistor TR53. A resistor R57 is connected between the base terminal of the transistor TR53 and the base terminal of the transistor TR54. A resistor R59 is connected between the base terminal and the collector terminal of the transistor TR53. The base terminal of the transistor TR52 is connected to the anode of a diode D53 via a resistor R54. The base terminal of the transistor TR53 is connected to the anode of the diode D53 via a resistor R56 and a diode D51. The base terminal of the transistor TR54 is connected to the anode of the diode D53 via a resistor R58 and a diode D52. The cathode of the diode D53 is connected to the ZCONT terminal of the control unit 201 via one terminal of a capacitor C51. The cathode of the diode D53 is connected to the anode of a diode D54. The cathode of the diode D54 is connected to the positive voltage Vtri1_P.

The resistance switching circuit 1040 operates as follows. When a Lo level control signal is output from the ZCONT terminal of the control unit 201, a current flows to the ZCONT terminal via the resistor R53, the resistor R54, the diode D53, and the capacitor C51. The current is then blocked by the capacitor C51. When a Hi level signal is output from the ZCONT terminal, a current flows from the ZCONT terminal to the positive power supply 1030 via the capacitor C51 and the diode D54. This current is also then blocked by the capacitor C51. When an alternately repeating Hi/Lo current is output from the ZCONT terminal, the current continuously flows without being blocked by the capacitor C51. Accordingly, charge is stored at the capacitor C51, and then the transistor TR52 turns on. In cooperation with this, the transistors TR53 and TR54 also turn on.

In other words, when a pulse signal that repeats Hi and Lo at a predetermined frequency or greater is output from the ZCONT terminal, the output resistance of the positive power supply 1030 corresponds to the resistor R34. When a Hi or a Lo signal is output from the ZCONT terminal, the output resistance of the positive power supply 1030 corresponds to the sum of the resistor R34, the resistor R55, the resistor R57, and the resistor R59 (combined resistor Ry).

In the fourth embodiment, each resistance value is selected such that resistor R34<<resistor R29 and resistor R29<<R55+R57+R59 are satisfied. Thus, when the ZCONT terminal outputs pulses, the voltage applied to the primary transfer rollers 136a, 136b, 136c, and 136d corresponds to approximately the positive voltage Vtri1_P. Conversely, when the ZCONT terminal outputs a Hi or Lo signal, the voltage applied to the primary transfer rollers 136a, 136b, 136c, and 136d corresponds to a value close to zero.

FIG. 12 illustrates the relationship between the control signal output by the control unit 201 and the voltage applied to the primary transfer rollers 136a, 136b, 136c, and 136d. In a case where a positive voltage is applied to the primary transfer rollers 136a, 136b, 136c, and 136d, the control unit 201 outputs a pulse signal from the ZCONT terminal. The T1P_CLK terminal is set to on. The T2N_CLK terminal is set to off or on. In this case, the output resistance of the positive power supply 1030 corresponds to R34. The output resistance of the negative power supply 220 corresponds to R29. Also, the voltage applied to the primary transfer rollers 136a, 136b, 136c, and 136d is represented by the following formula.

$$\frac{V_{tri1\_P} - \frac{R34}{R29} \times V_{tri2\_N}}{\frac{R34}{R29} + 1} \quad (3)$$

When the resistance value is set such that resistor R34<resistor R29 is satisfied, Formula (3) approaches the positive voltage Vtri1_P. In other words, the desired positive voltage is applied to the primary transfer rollers 136a, 136b, 136c, and 136d without the positive power supply 1030 generating a voltage higher than necessary. Also, irrespective of the operation state of the negative power supply 220, the desired positive voltage is applied to the primary transfer rollers 136a, 136b, 136c, and 136d.

In a case where a negative voltage is applied to the primary transfer rollers 136a, 136b, 136c, and 136d, the ZCONT terminal outputs a Hi or a Lo signal. The T1P_CLK terminal is set to off. The T2N_CLK terminal is set to on. In this case, the output resistance of the positive power supply 1030 corresponds to R34+R55+R57+R59 (=Ry). The output resistance of the negative power supply 220 corresponds to R29. The voltage applied to the primary transfer rollers 136a, 136b, 136c, and 136d is represented by the following formula.

$$\frac{1}{\frac{R29}{Ry} + 1} \times V_{tri2\_N} \quad (4)$$

As described above, when the resistance value is set such that resistor R29<<resistor Ry is satisfied, Formula (4) approaches the negative voltage Vtri2_N. In other words, the desired negative voltage can be applied to the primary transfer rollers 136a, 136b, 136c, and 136d without the negative power supply 220 generating a voltage higher than necessary.

According to the fourth embodiment, the resistance switching circuit 1040 is disposed on the output side of the positive power supply 1030. In this manner, the area required for insulation distance on the substrate can be reduced. As a result, the substrate size can be made smaller.

Fifth Embodiment

The resistance switching circuit 1040 according to the fourth embodiment includes the three PNP type transistors TR52, TR53, and TR54. However, it is sufficient that the number of transistors used in the resistance switching circuit 1040 is one or more. The number of PNP type transistors connected in series may be decided such that the voltage applied to the transistor does not exceed a rate voltage, the transistors can be mounted in the space on the substrate, and the manufacturing cost stays within the desired cost.

FIG. 13A illustrates the resistance switching circuit 1040 configured using one transistor, the transistor TR52. When a Lo level control signal is output from the ZCONT terminal of the control unit 201, a current flows to the ZCONT terminal via the resistor R53, the resistor R54, the diode D53, and the capacitor C51. The current is then blocked by the capacitor C51. When a Hi level signal is output from the ZCONT terminal, a current flows from the ZCONT terminal to the positive power supply 1030 via the capacitor C51 and the diode D54. This current is also then blocked by the capacitor C51. When an alternately repeating Hi/Lo pulse is output from the ZCONT terminal, the current continuously flows without being blocked by the capacitor C51. Accordingly, charge is stored at the capacitor C51, and then the transistor TR52 turns on.

In other words, when a pulse signal that repeats Hi and Lo at a predetermined frequency or greater is output from the ZCONT terminal, the output resistance of the positive power supply 1030 corresponds to the resistor R34. When a Hi or a Lo signal is output from the ZCONT terminal, the output resistance of the positive power supply 1030 corresponds to the sum of the resistor R34 and the resistor R55 (combined resistor Ry).

FIG. 13B illustrates how the resistor R55 can be omitted from the resistance switching circuit 1040 illustrated in FIG. 13A. In this case, when the transistor TR52 is turned off (opened), the emitter-collector resistance of the transistor TR52 corresponds to an extremely high resistance. In other words, the emitter-collector resistance may function as the resistor R55.

In this manner, if the withstand voltage of the transistor TR52 is sufficiently high, the number of PNP type transistors required for the resistance switching circuit 1040 can be reduced. In this manner, more space can be left on the substrate.

Sixth Embodiment

In a similar manner to the third embodiment, the fourth can be modified to use a toner that charges with a positive polarity. The sixth embodiment is a modification of the fourth embodiment for a toner that charges with a positive polarity.

Figure 14:
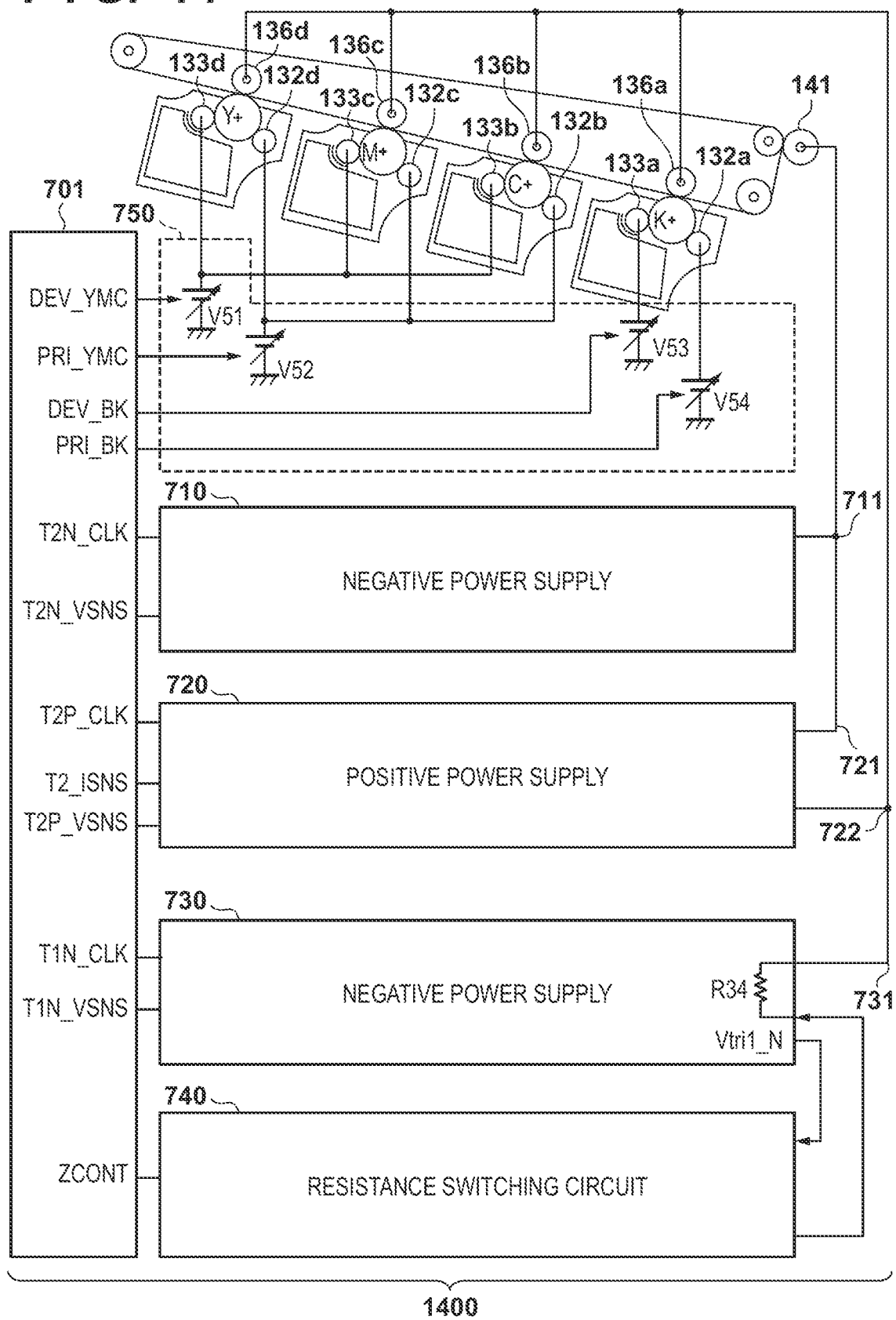
FIG. 14 is a diagram for describing another example of the power supply apparatus.

FIG. 14 illustrates a power supply apparatus 1400 according to the sixth embodiment. The power supply apparatus 1400 is different from the power supply apparatus 700 in that the resistance switching circuit 740 is inserted between the output unit of the negative power supply 730 and the resistor R34. The sixth embodiment shares all other points with the third embodiment.

Figure 15:
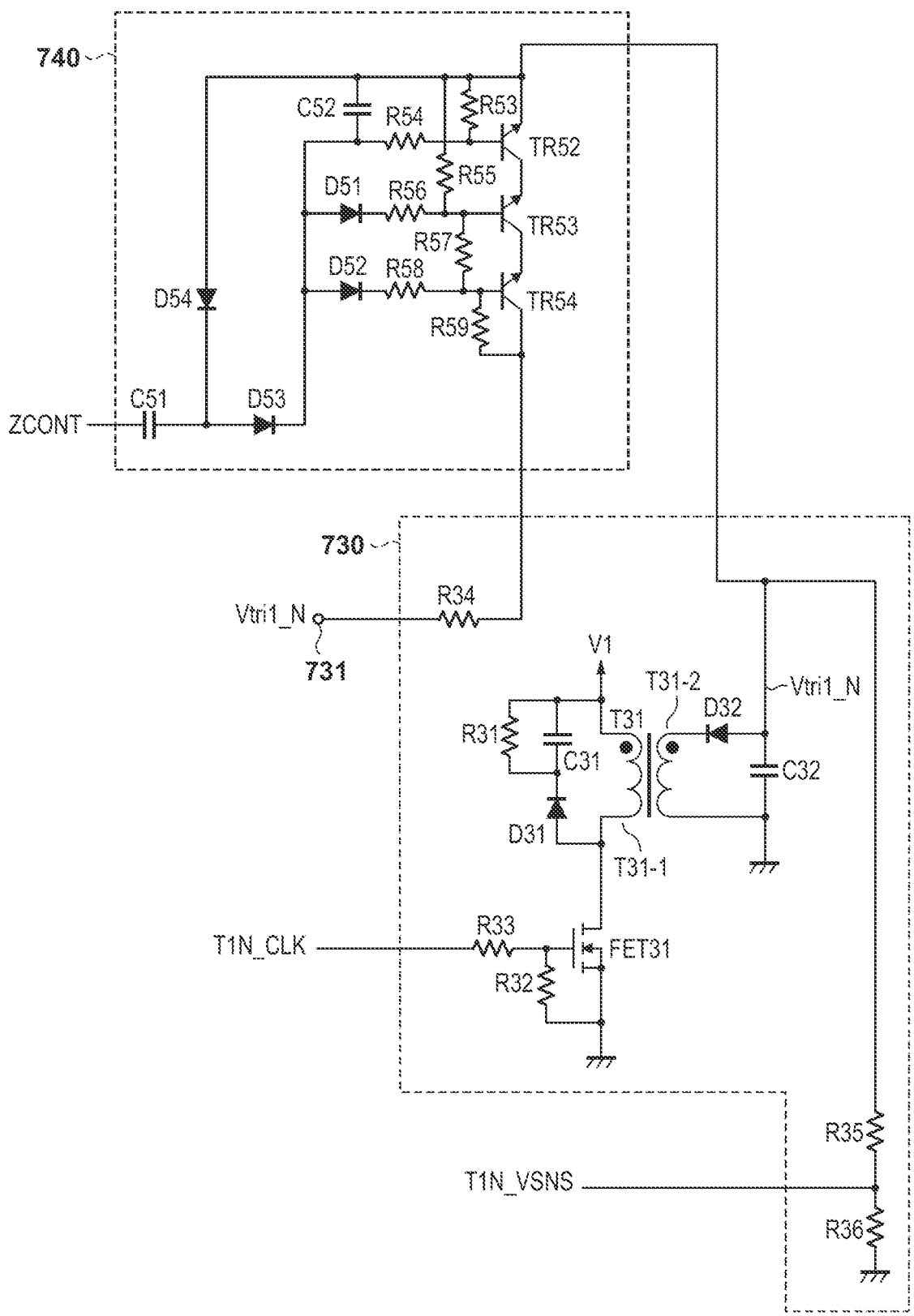
FIG. 15 is a diagram for describing another example of the negative power supply for primary transfer and the resistance switching circuit.

FIG. 15 is a circuit diagram of the negative power supply 730 and the resistance switching circuit 740 according to the sixth embodiment. In the negative power supply 730 according to the third embodiment, one end of the capacitor C32 is connected to the resistance switching circuit 740. In the sixth embodiment, one end of the capacitor C32 is connected to GND. Also, the resistance switching circuit 740 is inserted between the other end of the capacitor C32 and one end of the resistor R34.

The circuit configuration of the resistance switching circuit 740 is implemented by reversing the polarity of the electrical elements in the resistance switching circuit 1040 according to the fourth embodiment. In other words, the polarity of the diodes D51, D52, D53, and D54 is reversed. That is, the cathodes and anodes are swapped. In a similar manner, the transistors TR52 to TR54 are changed from a PNP type to an NPN type. That is, the emitter terminals and the collector terminals are swapped. The arrangement of the resistors R53 to R59 and the capacitors C51 and C52 is not changed.

In a case where a negative voltage is applied to the primary transfer rollers 136a, 136b, 136c, and 136d, the control unit 201 outputs a pulse signal from the ZCONT terminal. The T1N_CLK terminal is set to on. The T2P_CLK terminal is set to off or on. In this case, the output resistance of the negative power supply 730 corresponds to R34. The output resistance of the positive power supply 720 corresponds to R29. In the case of resistor R34<<resistor R29, the voltage applied to the primary transfer rollers 136a, 136b, 136c, and 136d approaches the negative voltage Vtri1_N.

In a case where a positive voltage is applied to the primary transfer rollers 136a, 136b, 136c, and 136d, the ZCONT terminal outputs a Hi or a Lo signal. The T1N_CLK terminal is set to off. The T2P_CLK terminal is set to on. In this case, the output resistance of the negative power supply 730 corresponds to R34+R55+R57+R59 (=Ry). The output resistance of the positive power supply 720 corresponds to R29. In the case of resistor R29<<resistor Ry, the voltage applied to the primary transfer rollers 136a, 136b, 136c, and 136d approaches the positive voltage Vtri2_P.

In this manner, the technical concept relating to the fourth embodiment can be modified to the sixth embodiment for a toner that charges with a positive polarity. In other words, the sixth embodiment can provide the power supply apparatus 1400 for a toner that charges with a positive polarity.

Technical Ideas Derived from the First to Sixth Embodiment

Item 1

The present embodiment provides a power supply apparatus different from known power supply apparatuses that can supply a voltage with a positive polarity and a voltage with a negative polarity by using a resistance switching circuit that switches the output resistance. The resistance switching circuit is disposed at a later stage than a plurality of power supplies and thus is advantageous in terms of manufacturing. The resistor R29 is an example of a first resistor. The resistors R45, R47, and R49 and the resistors R55, R57, and R59 are examples of second resistors.

Item 2

In a case where a DC voltage with a first polarity is applied to a load from a first power supply, the first power supply may be turned on. In a case where a DC voltage with a second polarity is applied to a load from a second power supply, the first power supply may be turned off, and the second power supply may be turned on.

Item 3

In a case where a DC voltage with the second polarity is applied to a load from the second power supply, the resistance switching circuit may be controlled such that, after the first power supply is turned off, the second resistor forms part of the output resistance.

This makes a large voltage difficult to be applied to the resistance switching circuit. In other words, the resistance switching circuit can be used while satisfying the withstand voltage of the resistance switching circuit.

Item 4

In a case where a DC voltage with the first polarity is applied to a load from the first power supply, the resistance switching circuit is controlled such that the second resistor does not form part of the output resistance. Thereafter, the first power supply may be turned on.

This makes a large voltage difficult to be applied to the resistance switching circuit. In other words, the resistance switching circuit can be used while satisfying the withstand voltage of the resistance switching circuit.

Item 5

The first power supply may apply a DC voltage with the first polarity to a load via a third resistor connected to the load. The third resistor may form the output resistance of the first power supply together with the second resistor. Note that the resistor R34 is an example of the third resistor.

Item 6

As described in the first embodiment and the like, the power supply voltage V1 is an example of a reference voltage supply. The transformer T31 is an example of a boost unit. The diode D32 and the capacitor C32 are examples of a rectifying and smoothing unit. The transformer T31, the diode D32, and the capacitor C32 are examples of a boost circuit.

Item 7

As described in the fourth embodiment, the resistance switching circuit 1040 may be disposed between the resistor R34 and the capacitor C32. Note that the transformer T31 is an example of a boost unit. The diode D32 and the capacitor C32 are examples of a rectifying and smoothing unit. The transformer T31, the diode D32, and the capacitor C32 are examples of a boost circuit.

Item 8

A DC voltage with the first polarity is divided by the first resistor and the third resistor and applied to a load. In other words, the connection point between the first resistor and the third resistor is connected to the load. In a case where the first resistor is sufficiently greater than the third resistor, mostly a DC voltage with the first polarity is applied to the load.

Item 9

The transistors TR42 to TR44 and TR52 to TR54 are examples of a semiconductor switch.

Item 10

The resistors R45, R47, and R49 and the resistors R55, R57, and R59 are examples of N number of subresistors (N being an integer of 1 or 2 or more). The transistors TR42 to TR44 and TR52 to TR54 are examples of N number of semiconductor switches.

Item 11

As described in the first, second, fourth, and fifth embodiment, the first polarity may be the positive polarity, and the second polarity may be the negative polarity.

Item 12

As described in the third and sixth embodiment, the first polarity may be the negative polarity, and the second polarity may be the positive polarity.

Item 13

The resistors R45, R47, and R49 are examples of a first subresistor, a second subresistor, and a third subresistor. The transistors TR42 to TR44 are examples of a first semiconductor switch, a second semiconductor switch, and a third semiconductor switch.

Item 14

The transistor TR41 is an example of a fourth semiconductor switch.

Item 15

The resistors R55, R57, and R59 are examples of a first subresistor, a second subresistor, and a third subresistor. The transistors TR52 to TR54 are examples of a first semiconductor switch, a second semiconductor switch, and a third semiconductor switch.

Item 16

The capacitor C51 is an example of a capacitor connected to one end of a control terminal (for example, the ZCONT terminal) of a control unit. The diode D53 is an example of a diode with its cathode connected to the other end of a capacitor.

Item 17

The primary transfer roller 136 is an example of a primary transfer member or a first transfer unit. The secondary transfer roller 141 is an example of a secondary transfer member or a second transfer unit. The photosensitive drum 131 is an example of a photosensitive member.

Item 18

The intermediate conveyor belt 135 is an example of an intermediate transfer member.

Item 19

The image forming apparatus may include the power supply apparatus as described in any one of items 1 to 19.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-197364, filed Dec. 9, 2022 which is hereby incorporated by reference herein in its entirety.

What is claimed is:

1. A power supply apparatus comprising:
    a first power supply configured to apply a DC voltage with a first polarity to a load;
    a second power supply connected in parallel with the first power supply, the second power supply being configured to apply a DC voltage with a second polarity, opposite the first polarity, to the load via a first resistor connected to the load;
    a resistance switching circuit including a second resistor forming an output resistance of the first power supply, the resistance switching circuit being configured to switch between a state in which the second resistor forms part of the output resistance and a state in which the second resistor does not form part of the output resistance; and
    a control circuit configured to control the first power supply, the second power supply, and the resistance switching circuit,
    wherein the control circuit is configured to
    in a case where the DC voltage with the first polarity is applied to the load from the first power supply, control the resistance switching circuit such that the second resistor does not form part of the output resistance, and
    in a case where the DC voltage with the second polarity is applied to the load from the second power supply, control the resistance switching circuit such that the second resistor forms part of the output resistance, and
    a resistance value of the output resistance when the second resistor is formed as part of the output resistance is greater than a resistance value of the output resistance when the second resistor is not formed as part of the output resistance.

2. The power supply apparatus according to claim 1, wherein the control circuit
    turns the first power supply on in a case where the DC voltage with the first polarity is applied to the load from the first power supply, and
    turns the first power supply off and the second power supply on in a case where the DC voltage with the second polarity is applied to the load from the second power supply.

3. The power supply apparatus according to claim 2, wherein
    in a case where the DC voltage with the second polarity is applied to the load from the second power supply, the control circuit controls the resistance switching circuit such that after the first power supply is turned off, the second resistor forms part of the output resistance.

4. The power supply apparatus according to claim 2, wherein
    in a case where the DC voltage with the first polarity is applied to the load from the first power supply, the control circuit turns the first power supply on after controlling the resistance switching circuit such that the second resistor does not form part of the output resistance.

5. The power supply apparatus according to claim 1, wherein
    the first power supply is configured to apply the DC voltage with the first polarity to the load via a third resistor connected to the load, and the third resistor forms the output resistance of the first power supply together with the second resistor.

6. The power supply apparatus according to claim 5, wherein
the first power supply includes a boost circuit including a boost unit and a rectifying and smoothing unit,
the third resistor is connected between the load and the boost circuit, and
the resistance switching circuit is connected between the boost circuit and a reference voltage supply.

7. The power supply apparatus according to claim 5, wherein
the first power supply includes a boost circuit including a boost unit and a rectifying and smoothing unit,
the third resistor is connected between the load and the boost circuit, and
the resistance switching circuit is connected between the third resistor and the boost circuit.

8. The power supply apparatus according to claim 5, wherein
the first resistor is greater than the third resistor.

9. The power supply apparatus according to claim 5, wherein
the second resistor includes N number of subresistors connected in series,
the resistance switching circuit further includes N number of semiconductor switches connected in parallel in a one-to-one relationship with the N number of subresistors,
the control circuit is configured to supply a control signal to each control terminal of the N number of semiconductor switches, and
the N number of semiconductor switches
short circuit such that the N number of subresistors do not form part of the output resistance in a case where the DC voltage with the first polarity is applied to the load from the first power supply, and
open such that the N number of subresistors form part of the output resistance in a case where the DC voltage with the second polarity is applied to the load from the second power supply.

10. The power supply apparatus according to claim 9, wherein
the first polarity is a positive polarity, and
the N number of semiconductor switches are each PNP type transistors.

11. The power supply apparatus according to claim 9, wherein
the first polarity is a negative polarity, and
the N number of semiconductor switches are each NPN type transistors.

12. The power supply apparatus according to claim 9, wherein
the N number is 3,
the N number of semiconductor switches include a first semiconductor switch, a second semiconductor switch, and a third semiconductor switch,
the N number of subresistors include a first subresistor, a second subresistor, and a third subresistor,
a current inflow terminal of the first semiconductor switch is connected to a reference voltage supply and one end of the first subresistor,
a current outflow terminal of the first semiconductor switch is connected to a current inflow terminal of the second semiconductor switch,
a control terminal of the second semiconductor switch is connected to another end of the first subresistor,
a current outflow terminal of the second semiconductor switch is connected to a current inflow terminal of the third semiconductor switch,
the control terminal of the second semiconductor switch is connected to the other end of the first subresistor and one end of the second subresistor,
a control terminal of the third semiconductor switch is connected to another end of the second subresistor and one end of the third subresistor, and
a current outflow terminal of the third semiconductor switch is connected to another end of the third subresistor and the first power supply.

13. The power supply apparatus according to claim 12, further comprising:
a fourth semiconductor switch where the control terminal of the first semiconductor switch, the control terminal of the second semiconductor switch, and the control terminal of the third semiconductor switch are connected in common, wherein
by turning the fourth semiconductor switch on or off, the control circuit turns on or off the first semiconductor switch, the second semiconductor switch, and the third semiconductor switch.

14. The power supply apparatus according to claim 9, wherein
the N number is 3,
the N number of semiconductor switches include a first semiconductor switch, a second semiconductor switch, and a third semiconductor switch,
the N number of subresistors include a first subresistor, a second subresistor, and a third subresistor,
a current inflow terminal of the first semiconductor switch is connected to the first power supply and one end of the first subresistor,
a current outflow terminal of the first semiconductor switch is connected to a current inflow terminal of the second semiconductor switch,
a control terminal of the second semiconductor switch is connected to another end of the first subresistor,
a current outflow terminal of the second semiconductor switch is connected to a current inflow terminal of the third semiconductor switch,
the control terminal of the second semiconductor switch is connected to the other end of the first subresistor and one end of the second subresistor,
a control terminal of the third semiconductor switch is connected to another end of the second subresistor and one end of the third subresistor, and
a current outflow terminal of the third semiconductor switch is connected to another end of the third subresistor and the third resistor.

15. The power supply apparatus according to claim 14, further comprising:
a capacitor with one end connected to a control terminal of the control circuit, and
a diode with a cathode connected to another end of the capacitor, wherein
an anode of the diode is connected in common to the control terminal of the first semiconductor switch, the control terminal of the second semiconductor switch, and the control terminal of the third semiconductor switch, and
the control circuit
by outputting pulse signals at a frequency such that the control terminal of the first semiconductor switch, the control terminal of the second semiconductor switch, and the control terminal of the third semiconductor switch are continuously on, turns on the first semiconductor switch, the second semiconductor switch, and the third semiconductor switch, and by stopping output of the pulse signals, turns off the first semiconductor switch, the second semiconductor switch, and the third semiconductor switch.

16. The power supply apparatus according to claim 1, wherein the resistance switching circuit further includes a semiconductor switch connected in parallel with the second resistor, the control circuit is configured to supply a control signal to a control terminal of the semiconductor switch, and the semiconductor switch short circuits such that the second resistor does not form part of the output resistance in a case where the DC voltage with the first polarity is applied to the load from the first power supply, and opens such that the second resistor forms part of the output resistance in a case where the DC voltage with the second polarity is applied to the load from the second power supply.

17. The power supply apparatus according to claim 1, wherein the load is a primary transfer member configured to transfer a toner image carried on a surface of a photosensitive member to an intermediate transfer member.

18. The power supply apparatus according to claim 1, wherein the second power supply is configured to supply a second DC voltage with the second polarity to a secondary transfer member configured to transfer a toner image to a sheet from an intermediate transfer member.

19. An image forming apparatus comprising:

a photosensitive member;

a charging member configured to charge the photosensitive member;

a light source configured to expose a surface of the photosensitive member to light to form an electrostatic latent image;

a developing member configured to develop the electrostatic latent image to form a toner image;

a primary transfer member configured to transfer the toner image from the photosensitive member to an intermediate transfer member;

a secondary transfer member configured to transfer the toner image from the intermediate transfer member to a sheet;

a fixing unit configured to fix the toner image on the sheet; and a power supply apparatus configured to supply a transfer promoting voltage to the primary transfer member which is a load, wherein the power supply apparatus includes a first power supply configured to apply a DC voltage with a first polarity to the load, a second power supply connected in parallel with the first power supply, the second power supply being configured to apply a DC voltage with a second polarity, opposite the first polarity, to the load via a first resistor connected to the load, a resistance switching circuit including a second resistor forming an output resistance of the first power supply, the resistance switching circuit being configured to switch between a state in which the second resistor forms part of the output resistance and a state in which the second resistor does not form part of the output resistance, and a control circuit configured to control the first power supply, the second power supply, and the resistance switching circuit, the control circuit is configured to in a case where the DC voltage with the first polarity is applied to the load from the first power supply, control the resistance switching circuit such that the second resistor does not form part of the output resistance, and in a case where the DC voltage with the second polarity is applied to the load from the second power supply, control the resistance switching circuit such that the second resistor forms part of the output resistance, and a resistance value of the output resistance when the second resistor is formed as part of the output resistance is greater than a resistance value of the output resistance when the second resistor is not formed as part of the output resistance.

\* \* \* \* \*